(12) United States Patent
Campbell

(10) Patent No.: US 10,935,650 B2
(45) Date of Patent: Mar. 2, 2021

(54) RADAR BASED THREE DIMENSIONAL POINT CLOUD FOR AUTONOMOUS VEHICLES

(71) Applicant: Waymo LLC, Mountain View, CA (US)

(72) Inventor: Timothy Campbell, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 440 days.

(21) Appl. No.: 15/852,501

(22) Filed: Dec. 22, 2017

(65) Prior Publication Data

US 2019/0195998 A1 Jun. 27, 2019

(51) Int. Cl.
  *G01S 13/42* (2006.01)
  *G01S 13/89* (2006.01)
  (Continued)

(52) U.S. Cl.
  CPC .......... *G01S 13/42* (2013.01); *G01S 7/03* (2013.01); *G01S 13/426* (2013.01); *G01S 13/4454* (2013.01); *G01S 13/87* (2013.01); *G01S 13/89* (2013.01); *G01S 13/90* (2013.01); *G01S 13/931* (2013.01); *G05D 1/0257* (2013.01); *H01Q 1/3233* (2013.01); *H01Q 21/00* (2013.01);
  (Continued)

(58) Field of Classification Search
  CPC ........ G01S 13/42; G01S 7/03; G01S 13/4454; G01S 13/9023; G01S 13/426; G01S 13/87; G01S 13/931; G01S 13/89; G01S 2013/93275; G01S 2013/93274; G01S 2013/93273; G01S 2013/93185; G01S 2013/9322; G01S 2013/9319; G01S 2013/9318; G01S 7/025; G01S 2007/027; G01S 13/90; H01Q 21/00; H01Q 1/3233; G05D 1/0257
  See application file for complete search history.

(56) References Cited

U.S. PATENT DOCUMENTS

| | | | |
|---|---|---|---|
| 7,411,542 B2 * | 8/2008 | O'Boyle | G01S 7/414 342/70 |
| 8,390,507 B2 * | 3/2013 | Wintermantel | G01S 7/032 342/70 |

(Continued)

*Primary Examiner* — Matthew B Barker
(74) *Attorney, Agent, or Firm* — McDonnell Boehnen Hulbert & Berghoff LLP

(57) ABSTRACT

Example embodiments described herein involve determining three dimensional data representative of an environment for an autonomous vehicle using radar. An example embodiment involves receiving radar reflection signals at a radar unit coupled to a vehicle and determining an azimuth angle and a distance for surfaces in the environment causing the radar reflection signals. The embodiment further involves determining an elevation angle for the surfaces causing the radar reflection signals based on phase information of the radar reflection signals and controlling the vehicle based at least in part on the azimuth angle, the distance, and the elevation angle for the surfaces causing the plurality of radar reflection signals. In some instances, the radar unit is configured to receive radar reflection signals using a staggered linear array with one or multiple radiating elements offset in the array.

14 Claims, 13 Drawing Sheets

(51) Int. Cl.
*G01S 13/90* (2006.01)
*G01S 13/931* (2020.01)
*H01Q 1/32* (2006.01)
*G05D 1/02* (2020.01)
*G01S 13/87* (2006.01)
*H01Q 21/00* (2006.01)
*G01S 13/44* (2006.01)
*G01S 7/03* (2006.01)
*G01S 7/02* (2006.01)

(52) U.S. Cl.
CPC ......... *G01S 7/025* (2013.01); *G01S 2007/027* (2013.01); *G01S 2013/9318* (2020.01); *G01S 2013/9319* (2020.01); *G01S 2013/9322* (2020.01); *G01S 2013/93185* (2020.01); *G01S 2013/93273* (2020.01); *G01S 2013/93274* (2020.01); *G01S 2013/93275* (2020.01)

(56) References Cited

U.S. PATENT DOCUMENTS

| | | | | |
|---|---|---|---|---|
| 8,436,763 | B2* | 5/2013 | Wintermantel | G01S 7/032 342/70 |
| 8,665,137 | B2* | 3/2014 | Wintermantel | G01S 7/032 342/59 |
| 2015/0285904 | A1* | 10/2015 | Rao | G01S 13/06 342/146 |
| 2016/0047907 | A1* | 2/2016 | Izadian | G01S 13/931 342/59 |
| 2017/0307744 | A1* | 10/2017 | Loesch | H01Q 21/296 |
| 2017/0322295 | A1* | 11/2017 | Loesch | G01S 7/032 |
| 2017/0322296 | A1* | 11/2017 | Rao | G01S 13/931 |
| 2019/0011532 | A1* | 1/2019 | Loesch | H01Q 21/065 |
| 2019/0265347 | A1* | 8/2019 | Wintermantel | G01S 13/42 |
| 2019/0391230 | A1* | 12/2019 | Loesch | H01Q 21/0025 |

\* cited by examiner

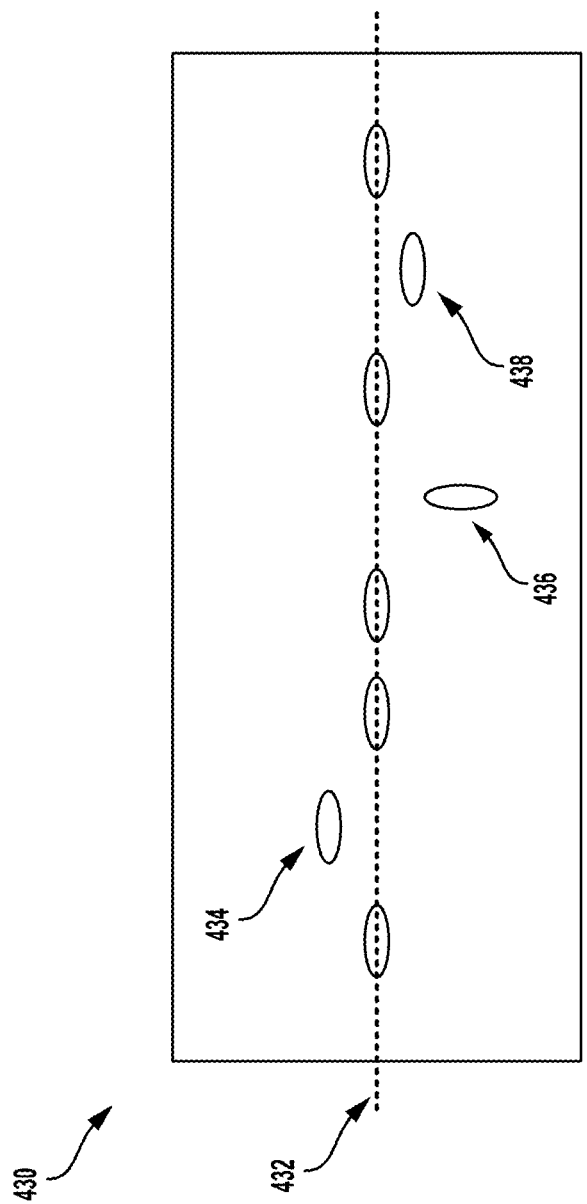

RADAR BASED THREE DIMENSIONAL POINT CLOUD FOR AUTONOMOUS VEHICLES

BACKGROUND

Radio detection and ranging (RADAR) systems can be used to actively estimate distances to environmental features by emitting radio signals and detecting returning reflected signals. Distances to radio-reflective features can be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped.

SUMMARY

Disclosed herein are embodiments that relate to determining three dimensional (3D) point clouds representative of an environment based on two dimensional (2D) radar measurements of the environment. A radar system may initially receive measurements of a nearby environment using a radar unit configured with a staggered linear array of antennas. By processing the incoming measurements, the radar system may determine a 3D representation of the measured environment that includes elevation information regarding objects and other surfaces positioned in the environment.

In one aspect, the present application describes a method. The method involves receiving, at a radar unit coupled to a vehicle in an environment, a plurality of radar reflection signals, and determining an azimuth angle and a distance for one or more surfaces in the environment causing the plurality of radar reflection signals. The method further involves, based on phase information of the plurality of radar reflection signals, determining an elevation angle for the one or more surfaces causing the plurality of radar reflection signals, and controlling the vehicle based at least in part on the azimuth angle, the distance, and the elevation angle for the one or more surfaces causing the plurality of radar reflection signals.

In another aspect, the present application describes a system. The system comprises a radar unit configured to receive a plurality of radar reflection signals, and a processor configured to determine an azimuth angle and a distance for one or more surfaces in an environment causing the plurality of radar reflection signals, and based on phase information of the plurality of radar reflection signals, determine an elevation angle for the one or more surfaces causing the plurality of radar reflection signals. The processor is further configured to control a vehicle based at least in part on the azimuth angle, the distance, and the elevation angle for the one or more surfaces causing the plurality of radar reflection signals.

In yet another example, the present application describes a non-transitory computer-readable medium configured to store instructions, that when executed by a computing system comprising one or more processors, causes the computing system to perform operations. The operations include receiving, at a radar unit coupled to a vehicle in an environment, a plurality of radar reflection signals and determining an azimuth angle and a distance for one or more surfaces in the environment causing the plurality of radar reflection signals. The operations further include, based on phase information of the plurality of radar reflection signals, determining an elevation angle for the one or more surfaces causing the plurality of radar reflection signals, and controlling the vehicle based at least in part on the azimuth angle, the distance, and the elevation angle for the one or more surfaces causing the plurality of radar reflections.

In another aspect, the present application describes a system comprising means for receiving, at a radar unit coupled to a vehicle in an environment, a plurality of radar reflection signals, and means for determining an azimuth angle and a distance for one or more surfaces in the environment causing the plurality of radar reflection signals. The system further comprises means for determining, based on phase information of the plurality of radar reflection signals, an elevation angle for the one or more surfaces causing the plurality of radar reflection signals, and means for controlling the vehicle based at least in part on the azimuth angle, the distance, and the elevation angle for the one or more surfaces causing the plurality of radar reflection signals.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4C illustrates a portion of a radar unit configured with a staggered linear array, according to example embodiments.

DETAILED DESCRIPTION

Figure 1:
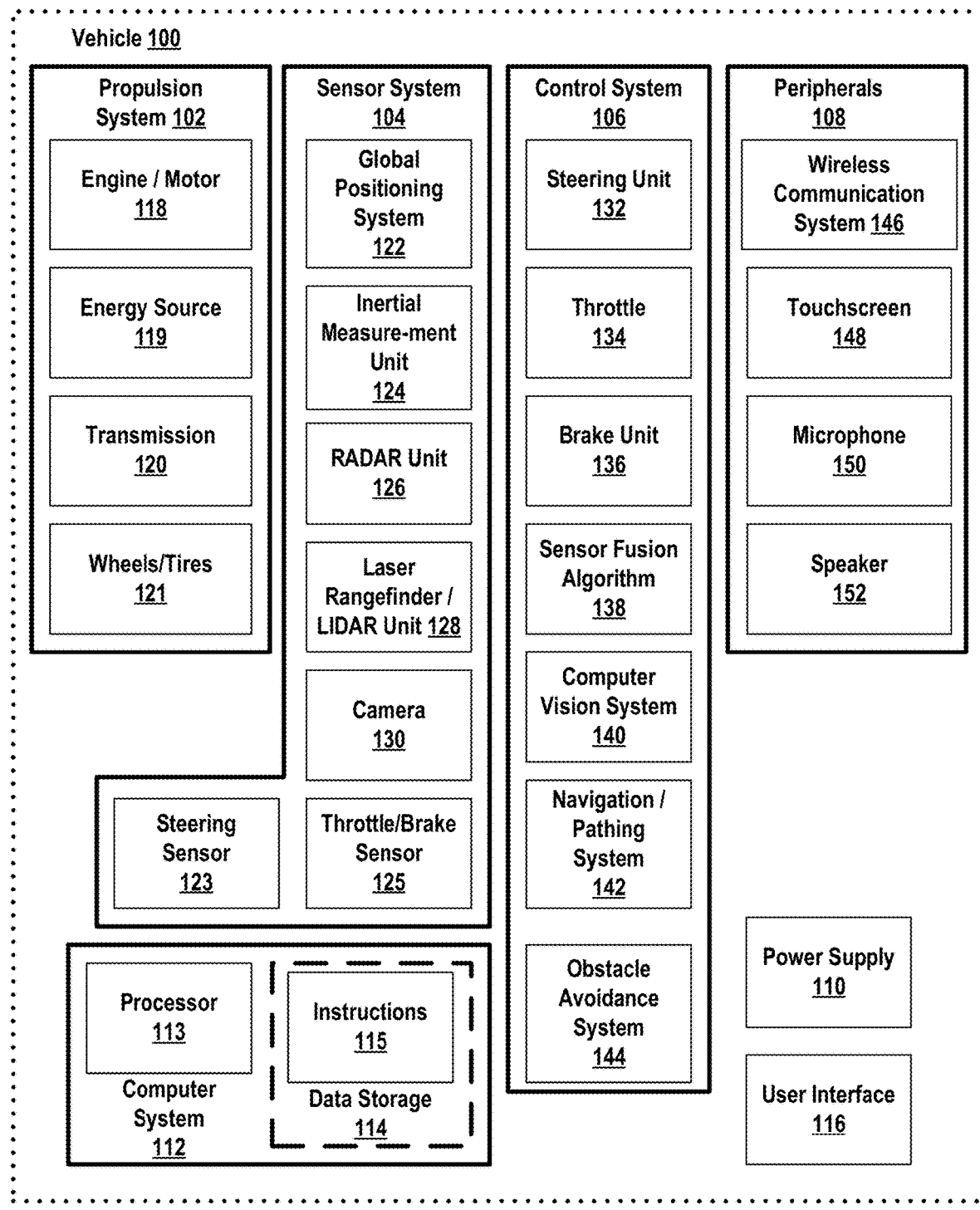
FIG. 1 is a functional block diagram illustrating a vehicle, according to example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system can use transmission antennas to emit (i.e. transmit) radar signals in predetermined directions to measure aspects of the environment. Upon coming into contact with surfaces in the environment, emitted radar signals can reflect or scatter in multiple directions with some of the radar signals penetrating into surfaces to some degree. Some of the radar signals, however, reflect off various surfaces in the environment and back towards the radar system enabling reception antennas of the radar system to capture the reflected radar signals. The received reflected signals can then be processed to determine locations of surfaces in the environment relative to the radar system. Particularly, processing the reflected signals can provide two dimensional (2D) measurements of aspects of the environment, including information indicating the positions, orientations, and potential movements of objects and other surfaces in the environment.

Because a radar system can measure distances to objects in the environment as well as motion of moving objects, radar systems are increasingly used to assist with vehicle navigation and safety. Particularly, a vehicle radar system can enable a system (e.g., vehicle control system) to detect and potentially identify nearby vehicles, road boundaries, weather conditions, traffic signs and traffic signals, and pedestrians, among other features within the environment surrounding the vehicle. As a result, the vehicle control system may use radar when determining a control strategy (e.g., path planning and obstacle avoidance) for autonomous or semi-autonomous navigation. As such, as the number of vehicles using radar systems continues to grow, there is a desire for affordable radar systems that can accurately measure the surrounding environment of a vehicle.

Many radar systems, including vehicle radar systems operating as part of a vehicle navigation system, are often configured to obtain 2D measurements of the environment surrounding the radar system. Particularly, radar can detect, measure, and provide a 2D understanding of the environment, including information regarding the position of objects and other surfaces in the environment relative to the position and orientation of the radar system. For example, a vehicle radar system may have radar units positioned at various locations on the vehicle (or built into aspects of the vehicle) at orientations that enable radar to be used to determine the distance of objects (e.g., vehicles, road boundaries) relative to the vehicle as well as the motion of nearby, moving objects (e.g., other vehicles). The configuration and operation of a radar system can vary within implementations with some consisting of radar units configured with linear arrays of antennas to capture 2D measurements of desired regions in the environment.

In order to obtain a 3D representation of the environment, a radar system may rely upon measurements from multiple radar units arranged at different orientations to form the 3D representation. Particularly, if each radar unit only has one linear array or multiple linear arrays aligned in the same configuration, more than one radar unit measuring a particular area might be required to capture enough measurements to determine 3D information about that area. A multiple radar unit set up, however, can increase cost of the overall radar system due to the need for multiple radar units arranged to capture multiple measurements in the same direction of the environment in order to form the 3D information. In addition, the multiple radar unit radar system might require complex processing software and resources (e.g., power) to align measurements from different radar units to roughly estimate a 3D representation of a region of the environment.

Examples embodiments presented herein involve determining 3D information using one or more radar units with antennas arranged in a staggered linear array. Particularly, rather than requiring multiple radar units arranged at different orientations and complex processing to align measurements to form a 3D representation of an environment, a radar unit configured with a staggered linear array of antennas may capture measurements that can enable a system to extract elevation information (i.e., the heights of surfaces and objects relative to the radar unit) in addition to position and orientation information. As a result, the measurements captured using a staggered linear array radar unit can be used to determine a 3D point cloud representative of an area in the environment without requiring multiple radar units measuring the same region from different orientations.

A staggered linear antenna array is similar to a linear array, but includes one or more antennas offset from a centerline of the array. Particularly, the centerline of the array represents hypothetical positions of where each antenna of the array would align if all of the antennas were part of a linear array without any offsets. As such, a centerline may extend along the middle of a radar unit in a vertical or horizontal position, along the middle of a portion of a radar unit (i.e., centerline is offset from the center of the overall radar unit), or other orientations relative to the radar unit (e.g., a slanted angle). By staggering one or multiple antennas (i.e., radiating elements) in the linear array configuration, the array may transmit (or receive) slightly offset radar signals.

In some examples, a staggered linear antenna array may involve a linear array of single antennas with one or more antennas offset from a centerline of the linear array. A radar unit may include multiple staggered linear antenna arrays with the configuration described above. In other examples, a staggered linear antenna array may involve multiple antenna arrays forming an overall linear antenna array with one or multiple antenna arrays offset relative to other antenna arrays in the linear antenna array. As shown, a staggered linear antenna array can include one or multiple antennas (or arrays of antennas) offset relative to other antennas (or relative to other antenna arrays).

In addition, by offsetting at least one antenna array, a phase center of the offset antenna array may be shifted from a centerline of multiple antenna arrays that make up the remainder of the staggered linear antenna array. The radar signals transmitted by offset transmission antennas and/or the reflected radar signals received by offset reception antennas can then be used to determine many 3D data points representative of the measured nearby environment, including adding elevation information to supplement spatial information captured using radar. By shifting the phase center, phase information may be used to help determine 3D data points. For instance, the phase information obtained by comparing measurements obtains by offset reception antennas and the centered reception antennas of a reception array can help a system form 3D point clouds that represent measured regions of the environment.

In some embodiments, a system may process measurements obtained via a staggered linear array on a radar unit to generate a 3D point cloud representation of the surrounding environment. Particularly, processing the measurements may involve factoring the difference in alignment between the radiating antennas in the staggered linear array along with incoming measurements to determine 3D data points that can represent the positions, elevations (i.e., heights), and orientations of surfaces in the environment. For example, a vehicle control system may use the radar system to determine a 3D point cloud that specifies the positions of nearby pedestrians, road elements (e.g., curbs, the road, nearby borders), traffic signals, and other vehicles, among other features in the environment. As a result, a radar system using radar units configured with staggered linear antenna arrays can reduce the number of radar units used to enable autonomous navigation by a vehicle.

Therefore, in some example implementations, a vehicle radar system can replace sets of radar units configured only with linear antenna arrays with radar units that have staggered linear antenna arrays. In turn, the modified radar system can cost less than traditional systems while also having the ability to determine 3D information about the environment, such as the position, orientation, and height of nearby objects, traffic signals, etc. Further, radar units designed with staggered linear antenna arrays may enable further functionality for a radar system overall. Particularly, these radar units may capture measurements (e.g., elevation data regarding surfaces in the environment) other types of radar units may not have the ability to obtain.

The following detailed description may be used with an apparatus having one or multiple antenna arrays that may take the form of a single-input single-output single-input, multiple-output (SIMO), multiple-input single-output (MISO), multiple-input multiple-output (MIMO), and/or synthetic aperture radar (SAR) radar antenna architecture.

Some example radar systems may use antennas that can focus the radiated energy into beams in order to enable the radar system to measure an environment with high accuracy, such as an environment around an autonomous or semi-autonomous vehicle. Such antennas may be compact (typically with rectangular form factors), efficient (i.e., with little of the 77 GHz energy lost to heat in the antenna or reflected back into the transmitter electronics), and low cost and easy to manufacture (i.e., radar systems with these antennas can be made in high volume).

In some embodiments, radar antenna architecture may include a plurality of "dual open-ended waveguide" (DOEWG) antennas. In some examples, the term "DOEWG" may refer to a short section of a horizontal waveguide channel plus a vertical channel that splits into two parts, where each of the two parts of the vertical channel includes an output port configured to radiate at least a portion of electromagnetic waves that enter the antenna. Additionally, a plurality of DOEWG antennas may be arranged into an antenna array, such as a staggered linear array of transmission and/or reception antennas with one or more of the antennas offset.

Example antenna architecture may comprise, for example, multiple metal layers (e.g., aluminum plates) that can be machined with computer numerical control (CNC), aligned properly, and joined together. The first metal layer may include a first half of an input waveguide channel, where the first half of the first waveguide channel includes an input port that may be configured to receive electromagnetic waves (e.g., 77 GHz millimeter waves) into the first waveguide channel. The first metal layer may also include a first half of a plurality of wave-dividing channels.

The plurality of wave-dividing channels may comprise a network of channels that branch out from the input waveguide channel and that may be configured to receive the electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. The waveguide antenna elements and/or the waveguide output ports may be rectangular in shape, in some embodiments. In some alternative embodiments, the waveguide antenna elements and/or the waveguide output ports may be circular in shape. Other shapes are also possible.

The rounded rectangular channels may serve as resonant chambers that can alter the polarization of incoming electromagnetic waves. For example, high energy leakage from one polarization to another polarization (e.g., from a horizontal $TE_{10}$ polarization to a vertical $TE_{10}$ polarization) may occur within the chamber. Unlike alternative methods of changing polarization in waveguides that make use of physical twists in a waveguide occurring over a many wavelength distance, the thickness of the polarization filter can be less than a wavelength (e.g., between a half and a whole wavelength of corresponding input electromagnetic waves) while still achieving sufficient polarization conversion. The rounded rectangular polarization-modification channels may also be designed such that evanescent waveguide modes emanating from the channel die out sufficiently quickly as they propagate away from the channel. Because of both of these factors, less energy loss may occur during the polarization conversion, resulting in increased energy efficiency when compared with alternate methods of rotating/changing polarization.

Based on the shape and the materials of the corresponding polarization-modification channels and waveguides, the distribution of propagating energy can vary at different locations within the antenna, for example. The shape and the materials of the polarization-modification channels and waveguides define the boundary conditions for the electromagnetic energy. Boundary conditions are known conditions for the electromagnetic energy at the edges of the polarization-modification channels and waveguides. For example, in a metallic waveguide, assuming the polarization-modification channel and waveguide walls are nearly perfectly conducting (i.e., the waveguide walls can be approximated as perfect electric conductors—PECs), the boundary conditions specify that there is no tangentially (i.e., in the plane of the waveguide wall) directed electric field at any of the wall sides. Once the boundary conditions are known, Maxwell's Equations can be used to determine how electromagnetic energy propagates through the polarization-modification channels and waveguides.

Maxwell's Equations may define several modes of operation for any given polarization-modification channel or waveguide. Each mode has one specific way in which electromagnetic energy can propagate through the polarization-modification channel or waveguide. Each mode has an associated cutoff frequency. A mode is not supported in a polarization-modification channel or waveguide if the electromagnetic energy has a frequency that is below the cutoff frequency. By properly selecting both (i) dimensions and (ii) frequency of operation, electromagnetic energy may propagate through the polarization-modification channels and waveguides in specific modes. The polarization-modification channels and/or the waveguides can be designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the respective polarization-modification channel or waveguide (e.g., assuming a rectangular waveguide). However, a suffix number of zero indicates that there is no variation of the field with respect to that direction. For example, a $TE_{10}$ mode indicates the polarization-modification channel or waveguide is half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is one wavelength in width (i.e., two half wavelengths) and one half wavelength in height.

When operating a waveguide in a TE mode, the suffix numbers also indicate the number of field-maximums along the respective direction of the waveguide. For example, a $TE_{10}$ mode indicates that the waveguide has one electric field maximum in the width direction and zero maxima in the height direction. In another example, a $TE_{21}$ mode indicates that the waveguide has two electric field maxima in the width direction and one maximum in the height direction.

Additionally or alternatively, different radar units using different polarizations may prevent interference between different radars in the radar system. For example, the radar system may be configured to interrogate (i.e., transmit and/or receive radar signals) in a direction normal to the direction of travel of an autonomous vehicle via SAR functionality. Thus, the radar system may be able to determine information about roadside objects that the vehicle passes. In some examples, this information may be two-dimensional (e.g., distances and directions to various objects along the roadside). In other examples, this information may be three-dimensional (e.g., a point cloud of various portions of detected objects). Thus, the vehicle may be able to "map" the side of the road as it drives along, for example.

Some examples may involve using radar units having antenna arrays arranged in MIMO architecture with transmission antennas offset vertically. Radar signals emitted by the transmission antennas are orthogonal to each other and can be received by one or multiple corresponding reception antennas. As such, the radar system or associated signal processor can perform 2D SAR image formation along with a 3D matched filter to estimate heights for pixels in a 2D SAR map formed based on the processed radar signals. For example, SAR may use the motion of a radar antenna (or array of radar antennas) over a target region to provide spatial resolution of a region of the environment.

If two autonomous vehicles are using analogous radar systems to interrogate the environment (e.g., using the SAR technique described above), it could also be useful for those autonomous vehicles to use different polarizations (e.g., orthogonal polarizations) to do the interrogation, thereby preventing interference. Additionally, a single vehicle may operate two radars units having orthogonal polarizations so that each radar unit does not interfere with the other radar unit.

Some example automotive radar systems may be configured to operate at an electromagnetic wave frequency in the W-Band, for example the frequency may be 77 Giga-Hertz (GHz), which correspond to millimeter (mm) wave electromagnetic waves.

Referring now to the figures, FIG. 1 is a functional block diagram illustrating example vehicle 100, which may be configured to operate fully or partially in an autonomous mode. More specifically, vehicle 100 may operate in an autonomous mode without human interaction (or reduced human interaction) through receiving control instructions from a computing system. As part of operating in the autonomous mode, vehicle 100 may use sensors to detect and possibly identify objects of the surrounding environment in order to enable safe navigation. In some implementations, vehicle 100 may also include subsystems that enable a driver to control operations (or a subset of operations) of vehicle 100.

As shown in FIG. 1, vehicle 100 may include various subsystems, such as propulsion system 102, sensor system 104, control system 106, one or more peripherals 108, power supply 110, computer system 112, data storage 114, and user interface 116. In other examples, vehicle 100 may include more or fewer subsystems, which can each include multiple elements. The subsystems and components of vehicle 100 may be interconnected in various ways (e.g., wired or wireless connections). In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100

(e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar unit 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects, including the speed and heading of the objects, within the local environment of vehicle 100. As such, radar unit 126 may include antennas configured to transmit and receive radar signals as discussed above. In some implementations, radar unit 126 may correspond to a mountable radar system configured to obtain measurements of the surrounding environment of vehicle 100.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2:
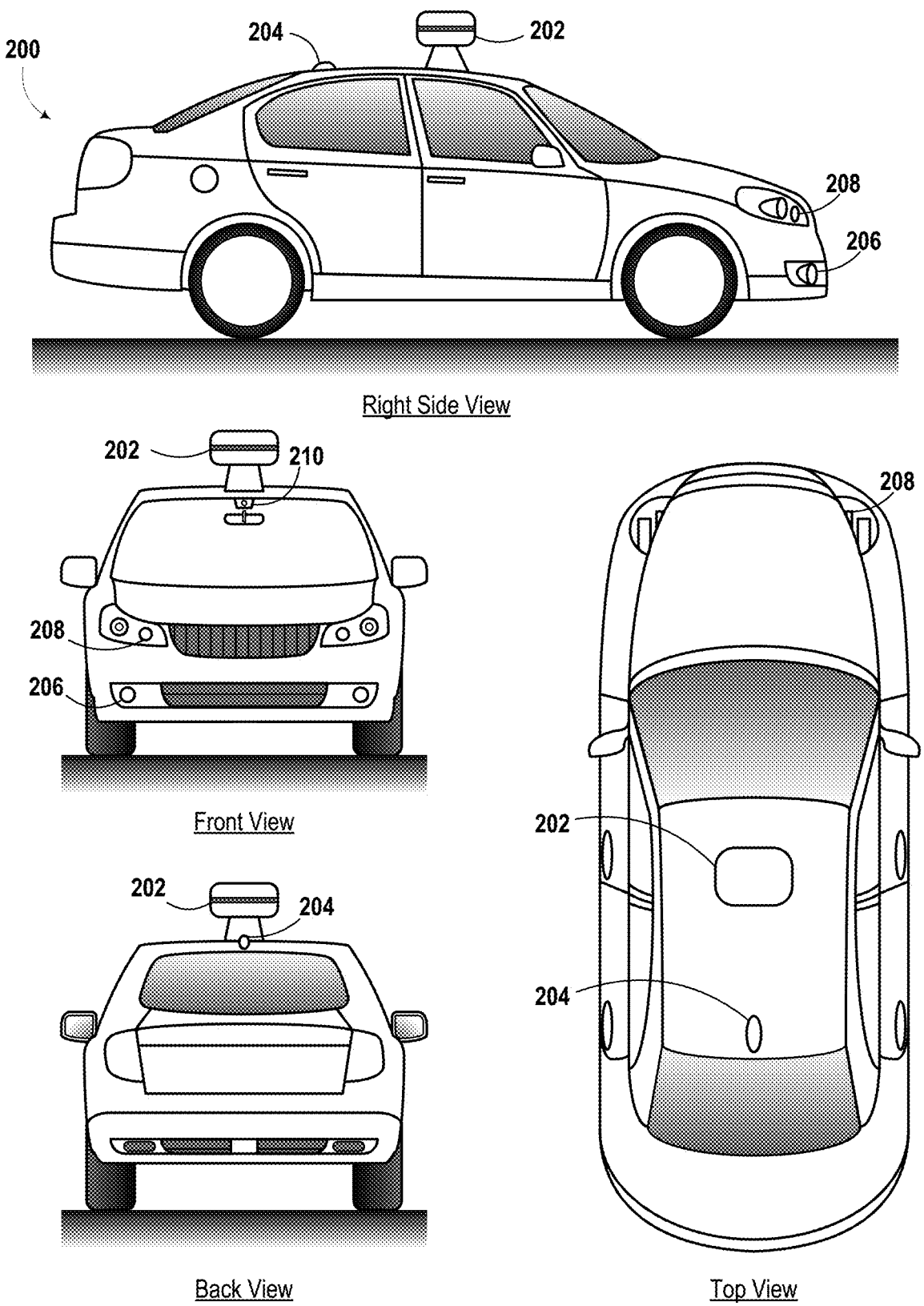
FIG. 2 illustrates a physical configuration of a vehicle, according to example embodiments.

FIG. 2 illustrates a physical configuration of vehicle 200, which may represent one possible physical configuration of vehicle 100 described in reference to FIG. 1. Depending on the embodiment, vehicle 200 may include sensor unit 202, wireless communication system 204, radio unit 206, deflectors 208, and camera 210, among other possible components. For instance, vehicle 200 may include some or all of the elements of components described in FIG. 1. Although vehicle 200 is depicted in FIG. 2 as a car, vehicle 200 can have other configurations within examples, such as a truck, a van, a semi-trailer truck, a motorcycle, a golf cart, an off-road vehicle, or a farm vehicle, among other possible examples.

Sensor unit 202 may include one or more sensors configured to capture information of the surrounding environment of vehicle 200. For example, sensor unit 202 may include any combination of cameras, radars, LIDARs, range finders, radio devices (e.g., Bluetooth and/or 802.11), and acoustic sensors, among other possible types of sensors. In some implementations, sensor unit 202 may include one or more movable mounts operable to adjust the orientation of sensors in sensor unit 202. For example, the movable mount may include a rotating platform that can scan sensors so as to obtain information from each direction around vehicle 200. The movable mount of sensor unit 202 may also be moveable in a scanning fashion within a particular range of angles and/or azimuths.

In some implementations, sensor unit 202 may include mechanical structures that enable sensor unit 202 to be mounted atop the roof of a car. Additionally, other mounting locations are possible within examples.

Wireless communication system 204 may have a location relative to vehicle 200 as depicted in FIG. 2, but can also have different locations within implementations. Wireless communication system 200 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems.

Camera 210 may have various positions relative to vehicle 200, such as a location on a front windshield of vehicle 200. As such, camera 210 may capture images of the environment of vehicle 200. As illustrated in FIG. 2, camera 210 may capture images from a forward-looking view with respect to vehicle 200, but other mounting locations (including movable mounts) and viewing angles of camera 210 are possible within implementations. In some examples, camera 210 may correspond to one or more visible light cameras. Alternatively or additionally, camera 210 may include infrared sensing capabilities. Camera 210 may also include optics that may provide an adjustable field of view.

Figure 3:
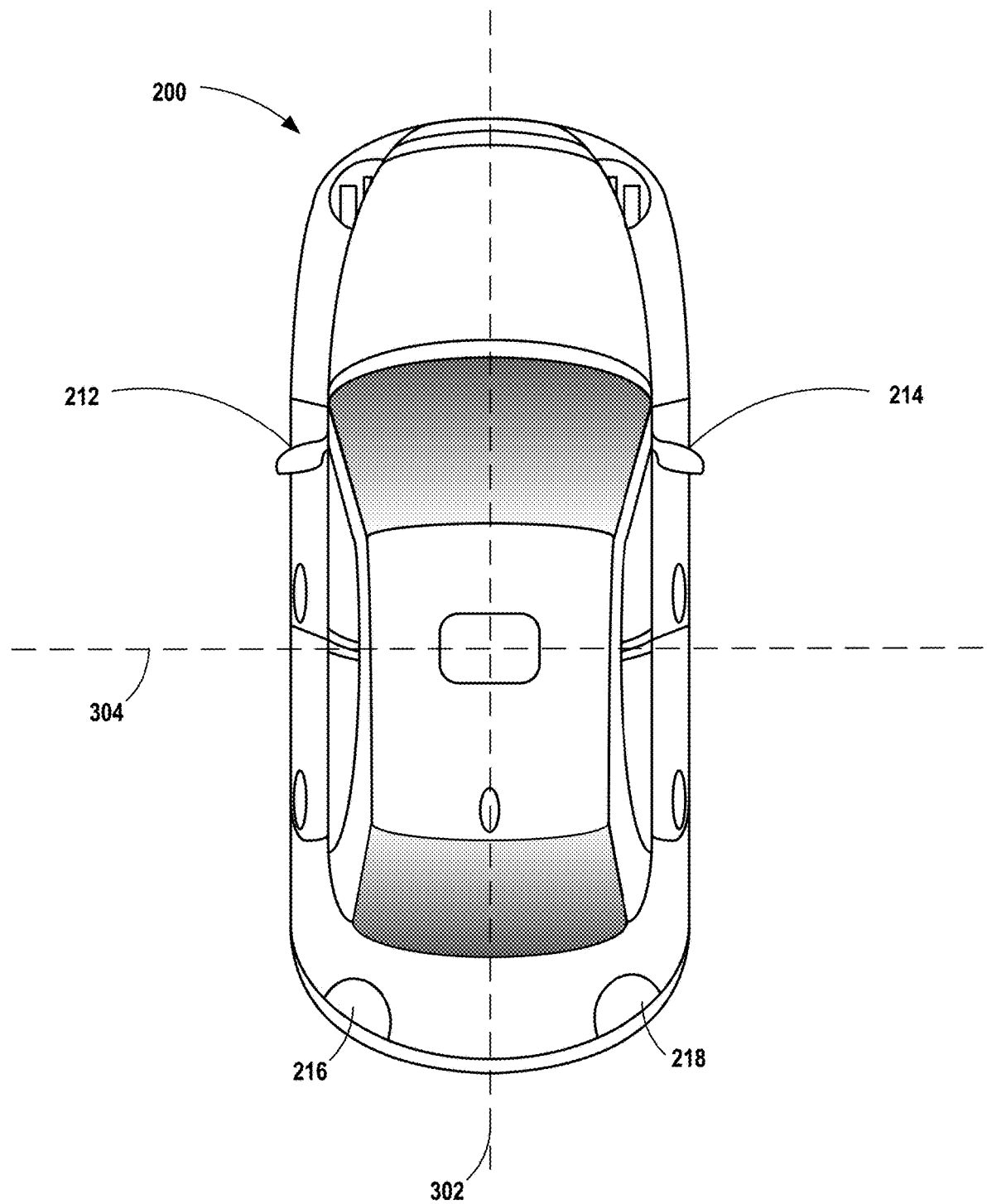
FIG. 3 illustrates a layout of radar sectors, according to example embodiments.

FIG. 3 illustrates an example layout of radar sectors for autonomous vehicle 200. As shown in FIG. 3, each of the radar sectors may have an angular width approximately equal to the scanning range of the radar units (as will be described with respect to FIG. 4A). For example, the sectors of FIG. 3 divide the azimuth plane around autonomous vehicle 200 into multiple 90 degree sectors. However, in examples where the radar units are configured to scan a radar beam over a different angle than 90 degrees (not shown), the width and number of sectors may change. Although FIG. 3 shows a car, example methods and systems presented herein may be used with other vehicular systems as well, such as aircraft, boats, etc.

As shown in FIG. 3, the radar sectors may align with the axes (302 and 304) of vehicle 200. For example, there may be a front left, front right, rear left, and rear right sector defined by the midpoints of vehicle 200. Because each sector corresponds to one radar unit, each radar unit may be configured to scan across one sector. Further, because each example radar unit of FIG. 3 has a scanning angle of approximately 90 degrees, each radar unit scans a region that approximately does not overlap with the scanning angle of any other radar unit. The layout of radar sectors shown in FIG. 3 is one example. Other possible layouts of radar sectors are possible as well.

In order to achieve radar sectors defined by the midpoints of vehicle 200, each radar unit may be mounted at a 45-degree angle with respect to the two axes of vehicle 200. By mounting each radar unit a 45 degree angle with respect to the two axes of vehicle 200, a 90 degree scan of the radar unit would scan from one vehicle axis to the other vehicle axis. For example, a radar unit mounted at a 45-degree angle to the axes in side mirror unit 212 may be able to scan the front left sector (i.e. from vertical axis 302 through the front of vehicle 200 to horizontal axis 304 that runs through the side of the vehicle).

An additional radar unit may be mounted at a 45-degree angle to the axes in side mirror unit 214 may be able to scan the front right sector. In order to scan the back right sector, a radar unit may be mounted in taillight unit 218. Additionally, in order to scan the back left sector, a radar unit may be mounted in taillight unit 216. The radar unit placements shown in FIG. 3 are merely to illustrate one possible example.

In various other examples, the radar units may be placed in other locations, such as on top or along other portions of the vehicle, or within or behind other vehicle components. Further, the sectors may also be defined differently in various embodiments. For example, the sectors may be at a 45-degree angle with respect to the vehicle. In this example, one radar unit may face forward, another backward, and the other two to the sides of the vehicle.

In some examples, all the radar units of vehicle 200 may be configured with the same scanning angle. The azimuth plane around the vehicle may equal to a full 360 degrees. Thus, if each radar unit is configured with the same scanning angle, then the scanning angle for the radar units would be equal to approximately 360 divided by the number of radar units on the vehicle. Thus, for full azimuth plane scanning, vehicle 200 with one radar unit would need that radar unit to be able to scan over the full 360 degrees.

If vehicle 200 had two radar units, each would scan approximately 180 degrees. For three radar units, each would be configured to scan 120 degrees. For four radar units, as shown in FIG. 3, each may scan approximated 90 degrees. Five radar units may be configured on vehicle 200 and each may be able to scan 72 degrees. Further, six radar units may be configured on vehicle 200 and each may be able to scan approximately 60 degrees. Other examples are possible In further examples, the number of radar units may be chosen based on a number of criteria, such as ease of manufacture of the radar units, vehicle placement, or other criteria. For example, some radar units may be configured with a planar structure that is sufficiently small. The planar radar unit may be mountable at various positions on a vehicle. For example, a vehicle may have a dedicated radar housing (or multiple radar housings) mounted on the top of the vehicle. The radar housing may contain various radar units. In other embodiments, radar units may be placed within the vehicle structure.

When radar units are located within the vehicle structure, each may not be visible from outside the vehicle without removing parts of the vehicle. Thus, the vehicle may not be altered aesthetically, cosmetically, or aerodynamically from adding radar units. For example, radar units may be placed under vehicle trim work, under bumpers, under grills, within housings for lights, within side mirrors, or other locations as well. In some embodiments, it may be desirable to place radar units in positions where the object covering the radar unit is at least partially transparent to radar. For example, various plastics, polymers, and other materials may form part of the vehicle structure and cover the radar units, while allowing the radar signal to pass through.

Additionally, in some embodiments, the radar units may be configured with different scanning ranges for different radar units. For example, in some embodiments a specific radar unit with a wide scanning angle may not be able to be placed on the vehicle in the proper location. Thus, a smaller radar unit, with a smaller scanning angle may be placed in that location. However, other radar units may be able to have larger scanning angles. Therefore, the total scanning angle of the radar units may add up to 360 degrees (or more) and provide full 360 degree azimuthal scanning. For example, a vehicle may have three radar units that each scan over 100 degrees and a fourth radar unit that scans over 60 degrees. Thus, the radar units may be able to scan the full azimuth plane, but the scanning sectors may not be equal in angular size.

Figure 4A:
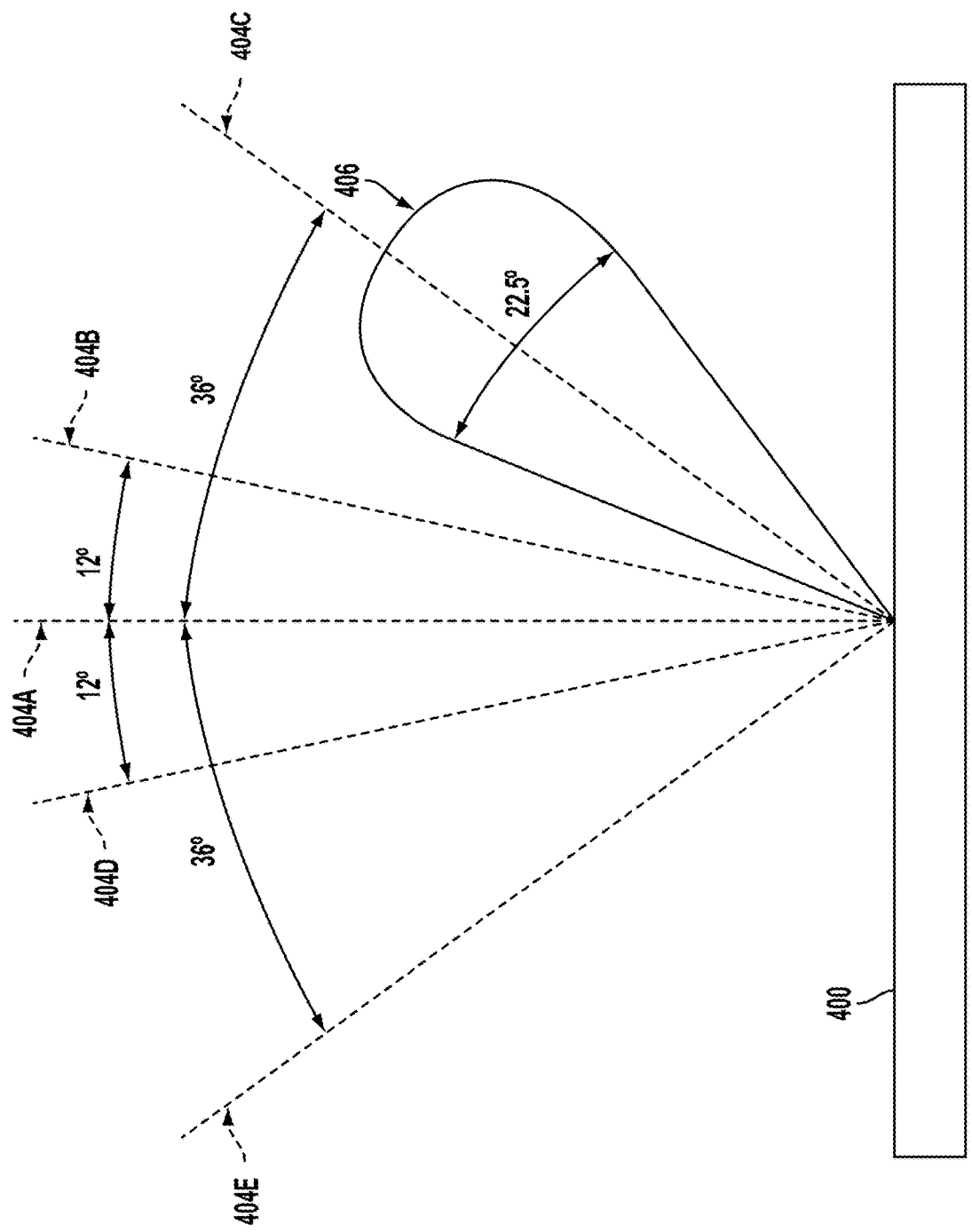
FIG. 4A illustrates beam steering for a sector for a radar unit, according to example embodiments.

FIG. 4A illustrates example beam steering for a sector for a radar unit 400. Radar unit 400 may be configured with a steerable beam, i.e., radar unit 400 may be able to control a direction in which the beam is radiated. Radar unit 400 can represent various types of radar configurations in example implementations. For instance, radar unit 400 may represent a radar unit with a staggered linear array of transmission and/or reception antennas.

As shown in FIG. 4A, radar unit 400 may obtain measurements of an environment in a particular direction. By controlling the direction in which the beam is propagated, radar unit 400 may be able to direct radiation in a specific direction in order to determine radar reflections (and thus objects) in that direction. In some embodiments, radar unit 400 may be able to scan a radar beam in a continuous manner across the various angles of the azimuth plane. In other embodiments, radar unit 400 may be able to scan the radar beam in discrete steps across the various angles of the azimuth plane.

As shown in FIG. 4A, radar unit 400 can generate radar beam 406 that can be steered across a plurality of different angles. As also shown in FIG. 4A, radar beam 406 may have a half-power beamwidth of approximately 22.5 degrees. The half-power beamwidth describes the width, measured in degrees, of a main lobe of radar beam 406 between two points that correspond to half the amplitude of the maximum of radar beam 406.

In various embodiments, the half-power beamwidth of radar beam 406 may be different than 22.5 degrees. Additionally, in some embodiments, the half-power beamwidth of radar beam 406 may change depending on the angle at which radar beam 406 is pointed. For example, the half-power beamwidth of radar beam 406 may be narrower when radar beam 406 is pointed more closely to orthogonal 404A (i.e. broadside) direction to the radiating surface and widen and radar beam 406 is steered away from the orthogonal direction 404A.

As further shown in FIG. 4A, radar unit 400 may be configured to steer radar beam 406 in different angles (e.g., four different angles). The steering angle may be measured with respect to orthogonal 404A (i.e. broadside) direction to the radiating surface. Radar beam 406 may also be steered to +36 degrees at 404C and −36 degrees at 404E, for example. Also, radar beam 406 may be steered to +12 degrees at 404B and −12 degrees at 404D. The four different angles may represent the discrete angles to which radar beam 406 may be steered.

In some additional examples, radar unit 400 may steer radar beam 406 to two angles simultaneously. For example, radar unit 400 may steer radar beam 406 to both +12 and −12 degrees at the same time. This may result in a beam that is overall steered in the direction of the sum of the angles (e.g. −12+12=0, thus the beam in this example would be in the broadside direction 404a). However, when a radar beam is steered at two directions at once, the half-power beamwidth of the radar beam may be widened. Thus, a radar resolution may decrease.

By steering radar beam 406 to each of angles 404B-404E, the full 90-degree field of view can be scanned. For example, when radar beam 406 is steered to +36 degrees 404C, the half-power beamwidth of radar beam 406 will cover from +47.25 degrees to +24.75 degrees (as measured from the broadside direction 404A). Additionally, when radar beam 406 is steered to −36 degrees 404E, the half-power beamwidth of radar beam 406 can cover from −47.25 degrees to −24.75 degrees. Further, when radar beam 406 is steered to +12 degrees 404B, the half-power beamwidth of radar beam 406 will cover from +23.25 degrees to +0.75 degrees. And finally, when radar beam 406 is steered to −12 degrees 404D, the half-power beamwidth of radar beam 406 will cover from −23.25 degrees to −0.75 degrees. Thus, radar beam 406 will effectively be able to scan (i.e. selectively enable or disable the four beams spanning the angular width) from −47.25 to +47.25 degrees, covering a range of 95 degrees. The number of steering angles, the direction of the steering angles, and the half-power beamwidth of radar beam 406 may be varied depending on the specific example.

For example, and further discussed below, a radar beam of a radar unit may be configured to only scan a 60-degree region. If a radar unit can scan a 60-degree region, six radar units may be used to scan a full 360 azimuth plane. However, if the radar unit can scan 90 degrees, four radar units may scan the full 360 azimuth plane.

Figure 4B:
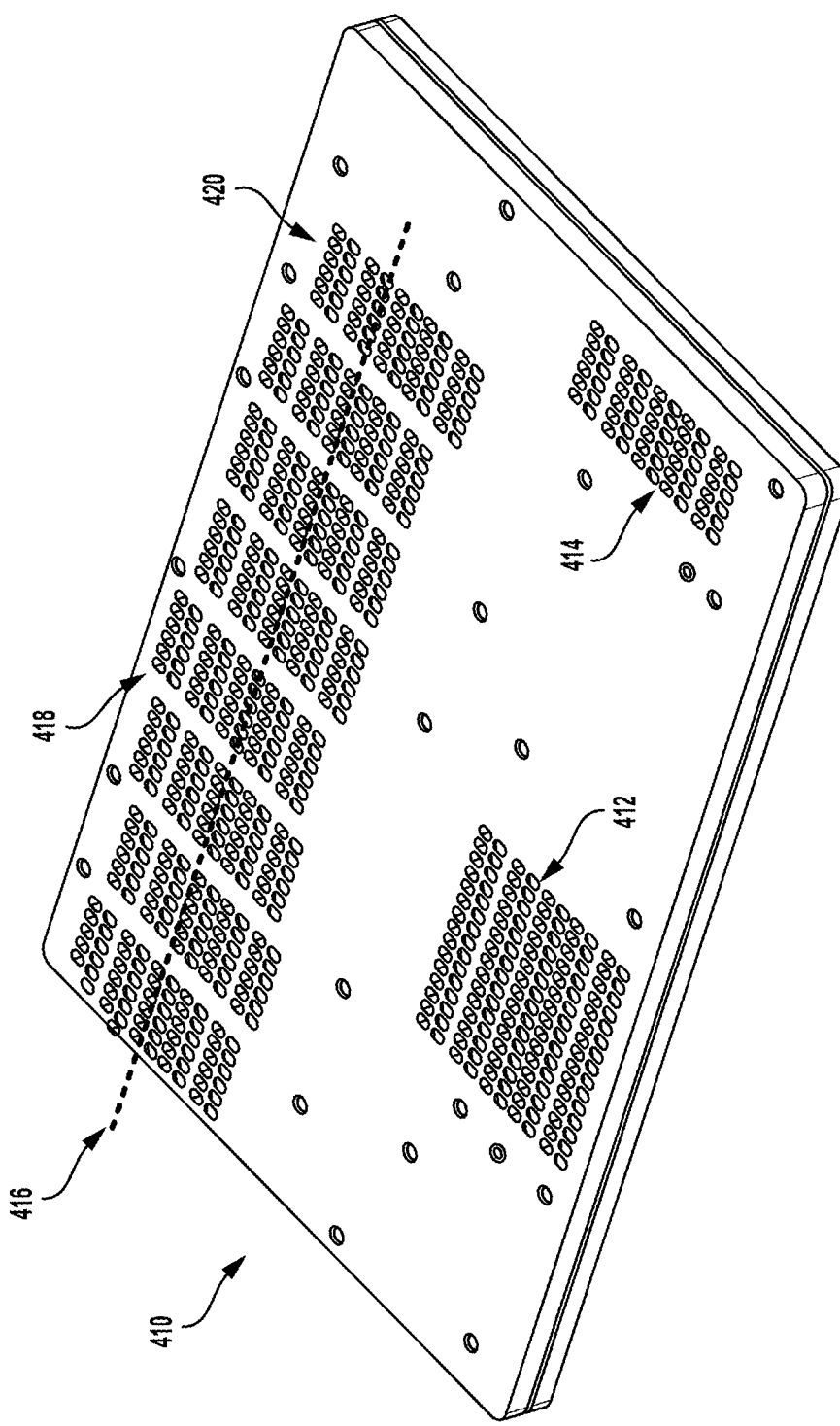
FIG. 4B illustrates a radar unit configured with a staggered linear array, according to example embodiments.

FIG. 4B illustrates radar unit 410 configured with a staggered linear array. As shown in FIG. 4B, radar unit 410 includes multiple antenna arrays, such as antenna arrays 412, 414, 418, and 420 (shown for illustration purposes). In other examples, radar unit 410 may include more or fewer antenna arrays, which can differ in configuration, size, position on radar unit 410, number of antennas within each array, and other possible parameters. In addition, radar unit 410 can have other configurations in other examples (e.g., curvature, different dimensions).

Radar unit 410 represents a radar unit that may operate as part of a radar system (e.g., a vehicle radar system) or as a standalone radar system. For example, radar unit 410 may couple to a part of a vehicle (or form part of a vehicle component). As such, configuration, materials, operation, and other possible parameters of radar unit 410 can vary within examples. For instance, radar unit 410 may be generated out of different materials in some examples and may be configured to operate in one or more particular polarizations (e.g., horizontal linear polarization, vertical linear polarization, slanted polarizations).

As shown in FIG. 4B, radar unit 410 includes multiple antenna arrays, which may each operate as a transmission array, a reception array, or a combination of transmission and reception antennas. As an example, array 412 may be a transmission antenna array and array 414 may be a reception antenna array.

Multiple antenna arrays of radar unit 410 are shown forming an example staggered linear array. The arrays (e.g., array 418, array 420) form the staggered linear array that is centered approximately along centerline 416, which is shown in FIG. 4B for illustration purposes (i.e., centerline 416 may not appear on a radar unit). As further shown in FIG. 4B, both array 418 and array 420 offset from the center (i.e., centerline 416) of the staggered linear array. More specifically, array 418 is shown offset from centerline 416 towards an outer edge of radar unit 410 causing array 418 to have a position closer to the outer edge of radar unit 410 compared to the other antenna arrays in the staggered linear array. Similarly, array 420 is also shown offset from centerline 416 of the staggered linear array. Array 420, however, is shown offset in an opposite direction compared to the offset of array 418. As a result, array 420 has a position that is closer to an overall center portion of radar unit 410 compared to other antenna arrays in the staggered linear array.

Centerline 416 is shown in FIG. 4B for illustration purposes to help illustrate potential offsets that one or more arrays may have within a staggered linear array. As such, centerline 416 is shown positioned in a non-center portion of radar unit 410, but can have other positions in examples (e.g., centerline 416 may extend along a center portion of a radar unit). In addition, the offsets of array 418 and array 420 are shown in FIG. 4B for illustration purposes, but the degree of offsets can differ in other implementations. For example, a first antenna array that is part of a staggered linear array may have a first offset and a second antenna array that is also part of the staggered linear array may have a second offset that differs from the first offset. As shown, the degree of offsets in a staggered linear antenna array can vary within examples.

In addition, other example staggered linear arrays may include more or fewer offset antennas (or antenna arrays). For example, another staggered linear array may have dozens of antennas offset from a centerline of the linear array. In further examples, an offset antenna or antenna array may also have a change in alignment or orientation relative to other antennas (or antenna arrays) in a staggered linear array.

Further, in some examples, a radar unit may include a staggered linear antenna array that involves a single antenna array arranged in a linear line with one or multiple antennas offset from the linear line. In some instances, a processor may also apply a virtual offset to one or multiple antennas (or antenna arrays) in a linear array (or staggered linear array). The virtual offset may emphasize an offset of some antennas in a stagger linear array and can be used to determine elevation information for surfaces in the environment measured via radar.

FIG. 4C illustrates a portion of a radar unit 430 configured with a staggered linear array. Particularly, portion 430 includes an example staggered linear array centered about centerline 432 (shown for illustration purposes). As shown in FIG. 4C, multiple radiating elements (i.e., antennas) are aligned in a linear configuration along centerline 432 with antenna 434, antenna 436, and antenna 438 offset from centerline 432. In other examples, a radar unit may include a staggered linear array with more or fewer antennas potentially arranged in other configurations.

Antenna 434 is shown offset in a first direction from centerline 432 and antennas 436, 438 are shown offset in a second direction. In other examples, a staggered linear antenna array may include antennas offset in a single direction from a centerline.

In addition, the example offsets of antennas 434, 436, 438 from centerline 432 are not equal as shown on portion 430. Other staggered linear arrays, however, can have antennas that are equally offset from a centerline.

Further, offset antenna 436 is shown having a different configuration (i.e., an altered orientation) compared to other antennas in the staggered linear array. In other examples, the configuration of antenna in the linear staggered array (including offset antennas) can be uniform or differ depending on the desired performance of the staggered linear array and the radar unit in general.

Figure 5:
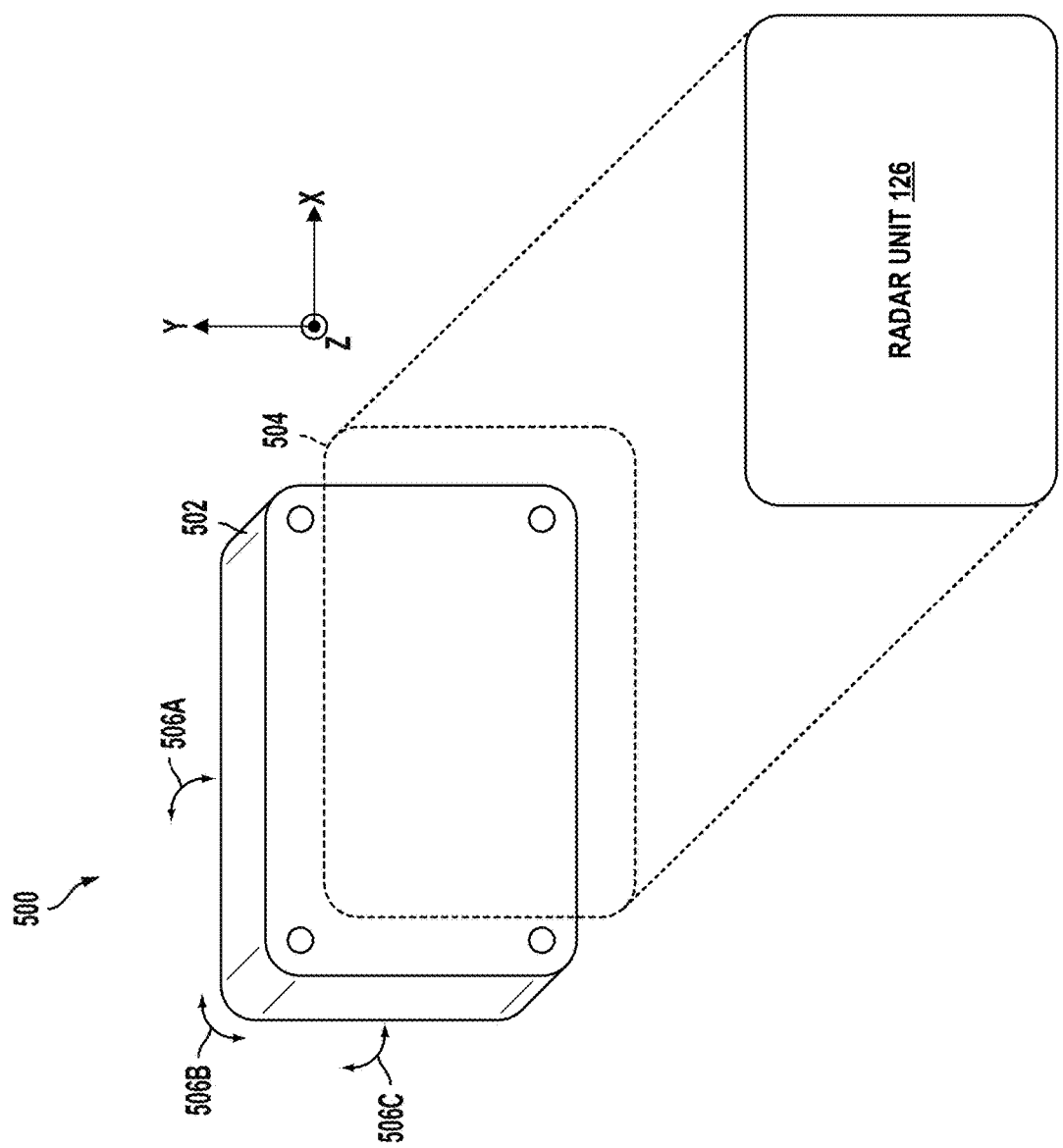
FIG. 5 illustrates a mount for coupling a radar unit to a vehicle, according to example embodiments.

FIG. 5 illustrates an example radar unit mounting structure 500, which can include mounting baseplate 502 and an associated mounting location 504. As shown, mounting structure 500 represents one potential configuration for coupling one or multiple radar units to a portion of a vehicle or other entity. In other examples, mounting structure 500 can have other configurations, including more or fewer components.

Mounting structure 500 can position radar unit 126 at various positions and orientations on a vehicle (e.g., vehicle 200). In some instances, mounting structure 500 may configure radar unit 126 to have a vertical orientation relative to the vehicle. In other uses, mounting structure 500 can position radar unit 126 to have other orientations (e.g., horizontal, slanted) relative to the vehicle. As such, mounting location 504 represents the location for coupling radar unit 126 to mounting baseplate 502.

As further shown in FIG. 5, mounting baseplate 502 may include mounting holes configured to both align and couple radar unit 126. Mounting baseplate 502 of FIG. 5 is one example of a way the various radar units may be mounted to an autonomous vehicle. When radar unit 126 is mounted to mounting baseplate 502, radar unit 126 may not be exactly aligned as designed. This misalignment may manifest as an offset from the desired mounting position. For example, radar unit 126 may have an offset when coupled to mounting baseplate 502 in terms of the elevational angle offset 506*a*, roll angle offset 506*b*, and azimuthal angle offset 506*c*.

Additionally, radar unit 126 can have an offset when coupled to mounting baseplate 502. For instance, in some examples, the offset can differ in terms of the X offset, Y offset, and Z offset. The offset can depend on various factors, such as a desire for radar unit 126 to be mounted within a threshold range around a desired direction. As such, when the radar unit is mounted within a known, threshold range, the offset of the radar unit may be calculated enabling radar signals to be processed with the offset factored. For example, each of elevational angle 506A, roll angle 506B, and azimuthal angle 506C may have a threshold range of ±1 degree from the desired elevational angle, roll angle, and azimuthal angle. By determining the offsets, a processing system can mathematically compensate for the difference between the desired alignment and the actual alignment.

Figure 6:
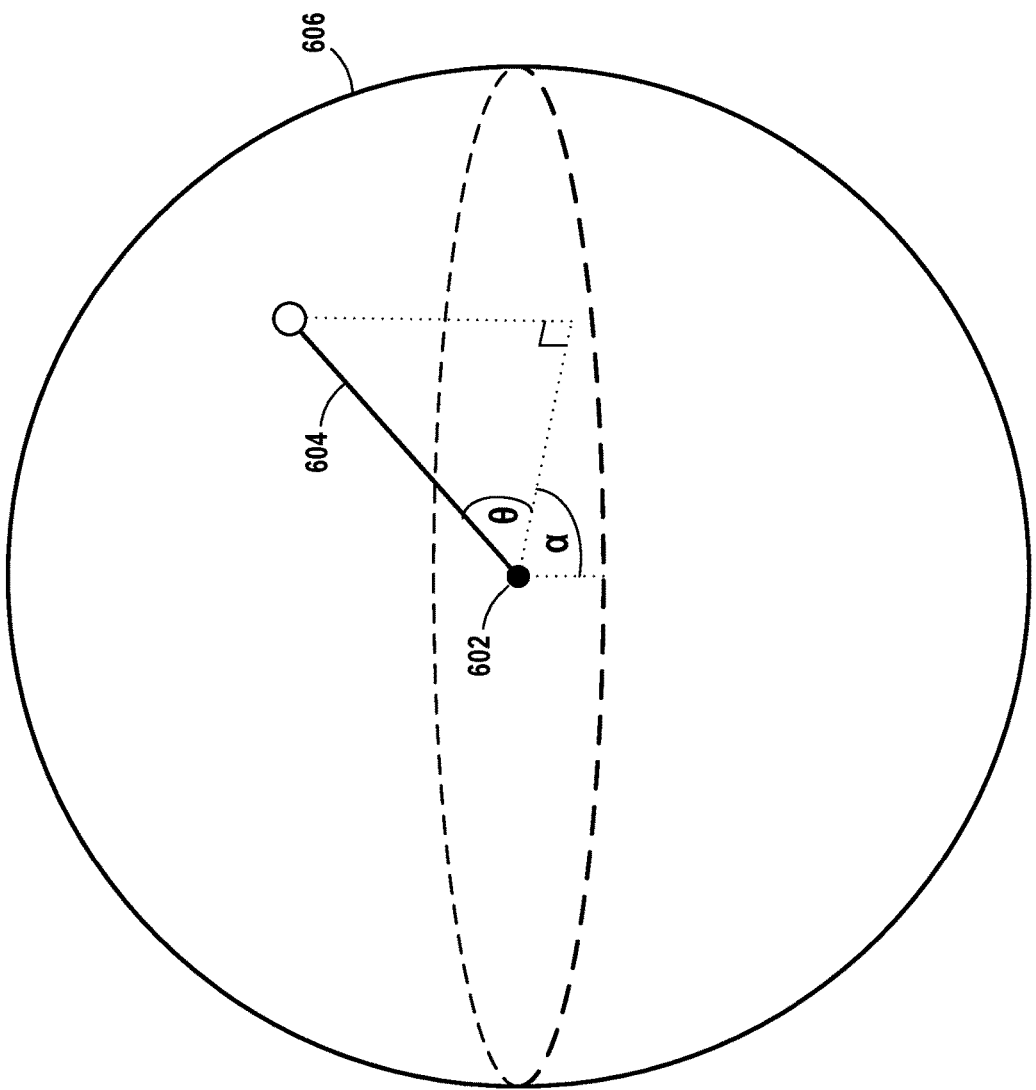
FIG. 6 illustrates determining three dimensional (3D) information using radar measurements, according to example embodiments.

FIG. 6 illustrates determining three dimensional (3D) information using radar measurements. As shown in FIG. 6, radar unit 602 represents a radar unit configured with a staggered linear antenna array that can transmit radar beam 604 according to horizontal coordinate system 606. In particular, radar unit 602 is shown in a given position transmitting and receiving reflections of radar beam 604 in various directions in the environment, including directions that differ in altitude (i.e., elevation) and azimuth relative to the given position. Except for interference from the vehicle (e.g., vehicle 200) or another entity that radar unit 602 is coupled to, radar unit 602 can be used to capture measurements in numerous directions, angles, and distances as shown in FIG. 6.

In some examples, the azimuth angle for a surface reflecting radar signals back to a radar system may represent the angle of the radar beam with respect to north. The angle of the radar beam with respect to the ground may correspond to the elevation angle of a reflective surface. Further, distance (or range) may represent the distance from the radar unit to the reflecting surface (or from the reflecting surface to the radar unit).

Further, in some examples, a surface may include multiple elevation angles, azimuth angles, and distances depending on the configuration of the surface. For example, a tall object may have a similar distance relative to the radar unit, but can have a base portion that has a different elevation angle compared to elevation angle that describes the top portion of the object. As such, when processing radar signals that reflect off surfaces in the environment, the processing can produces results that indicate data points that correspond to surfaces that are part of the same object in some examples.

Figure 7A:
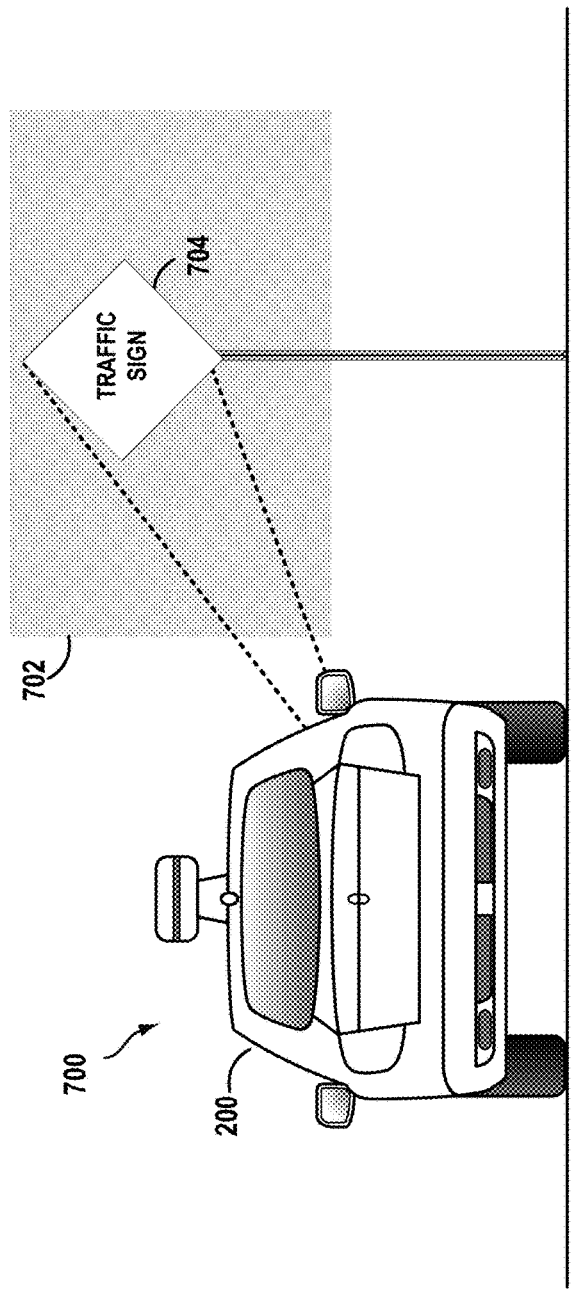
FIG. 7A illustrates a scenario involving measuring the presence of a traffic sign using radar, according to example embodiments.

FIG. 7A illustrates scenario 700 involving measuring the presence of traffic sign 704 using radar. Scenario 700 includes vehicle 200 operating in an environment that includes traffic sign 704. As vehicle 200 navigates, a radar system of vehicle 200 may capture measurements of the surrounding environment. For example, the radar system may include one or multiple radar units coupled to vehicle 200 that include antennas arranged in a staggered linear array. As such, the radar system may capture measurements of the nearby environment, including region 702 that contains traffic sign 704. The size and position of region 702 is shown in 7A for illustration purposes, but can differ depending on various factors, such as the position and orientation of radar units, the width and power of the beams transmitted by the radar units, among other factors.

The radar system of vehicle 200 may analyze measurements of region 702 depicting the environment to detect and potentially identify traffic sign 704. In particular, using techniques described herein, the radar system may determine a 3D representation of region 702, including data points that indicate that structure, elevation, position, and orientation of traffic sign 704 in the environment relative to vehicle 200.

In some examples, the radar system of vehicle 200 may include one or multiple radar units configured with an antenna array in MIMO architecture. Particularly, transmission antennas can have offset vertical alignments resulting in the transmitted radar signals being orthogonal to each other. As such, upon receiving reflections of these radar signals, the radar system (or another signal processor) can perform 2D image formation to develop a 2D map of the region of the environment measured by the radar signals. The radar system (or signal processor) may further use a 3D matched filter to estimate the height of each pixel in the 2D map of the region. As a result, the radar system (or signal processor) can create a 3D map of objects surrounding vehicle 200 that can assist in operation in vehicle 200. In some examples, the generated 3D map can be used in various weather conditions, including rain, storms, wet and snowy conditions, among others.

Figure 7B:
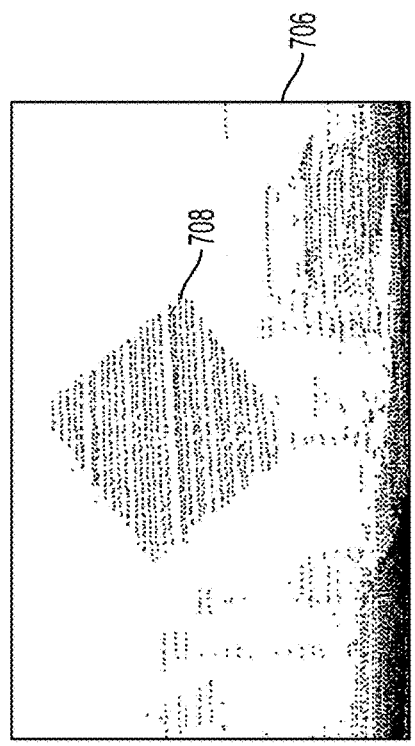
FIG. 7B illustrates a three dimensional (3D) representation of the traffic sign measured using radar in FIG. 7A, according to example embodiments.

FIG. 7B illustrates 3D representation 706 of traffic sign 704 measured using radar as shown in FIG. 7A. As shown, 3D representation 706 includes a cluster of data points 708 indicative of traffic sign 704 measured using radar as shown in FIG. 7A. The cluster of data points 708 form the face and borders of traffic 704 measured using the radar system of vehicle 200.

Figure 7C:
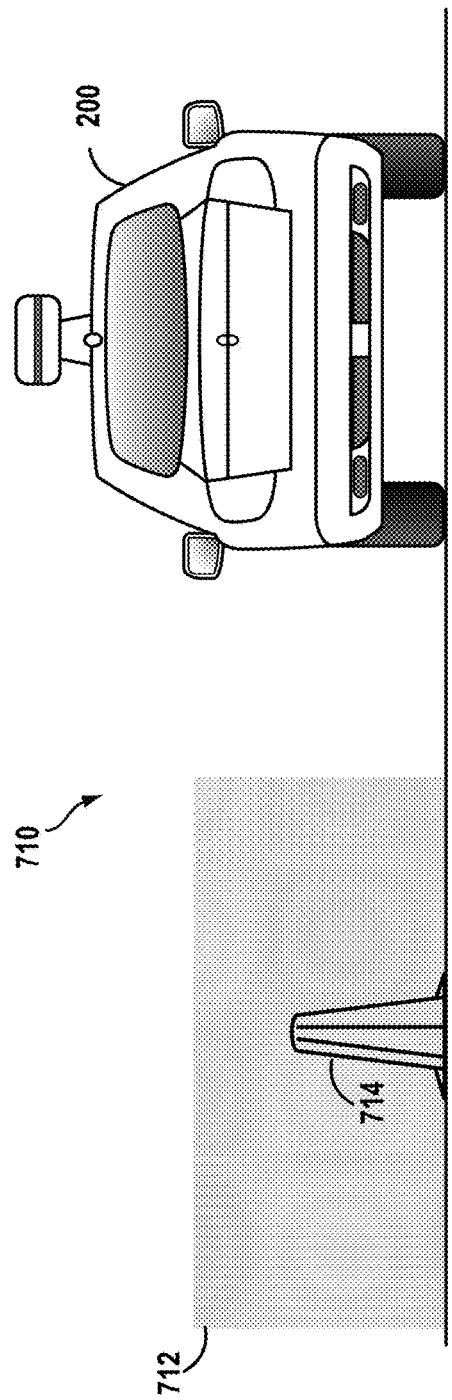
FIG. 7C illustrates another scenario involving measuring the presence of a traffic cone using radar, according to example embodiments.

FIG. 7C illustrates scenario 710 involving measuring the presence of traffic cone 714 using radar. Scenario 710 includes vehicle 200 operating in an environment that includes traffic cone 714. As vehicle 200 navigates, a radar system of vehicle 200 may capture measurements of the surrounding environment. For example, the radar system may include one or multiple radar units coupled to vehicle 200 that include antennas arranged in a staggered linear array. As such, the radar system may capture 2D measurements of the nearby environment, including region 712 that contains traffic sign 714. The size and position of region 712 is shown in 7C for illustration purposes, but can differ depending on various factors, such as the position and orientation of radar units, the width and power of the beams transmitted by the radar units, among other factors.

Figure 7D:
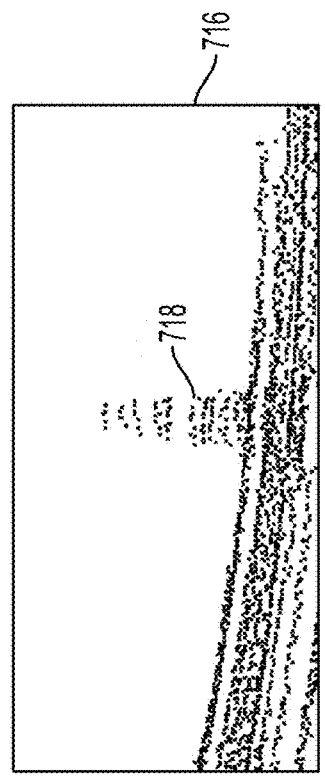
FIG. 7D illustrates a three dimensional (3D) representation of the traffic cone measured using radar in FIG. 7C, according to example embodiments.

FIG. 7D illustrates 3D representation 716 depicting traffic cone 714 measured using radar as illustrated in FIG. 7C. In particular, 3D representation 716 includes a cluster of data points 718 indicative of traffic cone 714 measured using radar as shown in FIG. 7B. The cluster of data points 708 form the face and borders of traffic cone 714 measured using the radar system of vehicle 200.

Figure 8:
FIG. 8 illustrates a three dimensional (3D) representation of a scene measured using radar, according to example embodiments.

FIG. 8 illustrates a three dimensional (3D) representation of a scene measured using radar. The spatial point cloud may be generated by a radar system using one or multiple radar units having staggered linear radar array. As shown in FIG. 8, scenario 800 may include a representation of predestination 802, among other possible features in the environment (e.g., traffic signals, other vehicles, etc.).

A radar system may use one or multiple radar units to capture measurements of the environment as shown in scenario 800. The radar measurements may provide 2D indications of the positions, orientations, and motion of features in the environment. As such, the system may process incoming measurements to develop 3D point cloud data indicative of the environment.

As discussed above, some examples involve using radar configured with multiple antennas. For instance, a radar unit may include antenna arrays arranged in MIMO architecture with transmission and/or reception antennas offset vertically (physically or virtually). As a result, the radar unit can transmit orthogonal radar signals as the radar unit moves throughout an environment in the x-y plane. As the radar unit moves throughout the environment, there is a phase progression across the antennas aligned vertically such the rate of the phase progression is proportional to the height of a scatterer (e.g., reflecting surface). When forming a 2D image on the vertical channels, there exists a stack of complex values that have a phase progression dependent on the z-position of the scatterer at that x-y pixel for every x-y pixel (or a subset of the x-y pixel) in the 2D image. Below is an example implementation for deriving the relationship and filters for determining the z-position for each x-y pixel in the 2D SAR image.

To illustrate, $N_r$ represents the number of receive channels and $N_t$ represents the number of transmit channels of an example radar system moving through a space. When the radar system is operating, $N_p$ represents the number of pulses performed by the radar system and $N_k$ represents the number of analog-to-digital conversion (ADC) samples per pulse. Further, although different types of radar systems can be used, the radar system in the present example may use of a pulse-Doppler stretch linear frequency modulated (LFM) waveform with intra-channel pulse repetition frequency $f_p$ and inter-pulse period ($I_p$). As such, the radar system may operate with the transmit channels configured to activate in sequence after each pulse such that given intervals between transmissions by the transmit channels is represented by interval ($I_c$). In some instances, the inter-pulse period ($I_p$) may equal (or approximately equal) the interval between transmit channels ($I_c$) multiplied by the overall number of transmit channels of the radar system ($N_t$) as shown in equation [1].

$$I_p = I_c * N_t \quad [1]$$

Furthermore, n represents the pulse indexing variable and p represents the transmit channel indexing variable associated with the radar unit. Accordingly, $v_p$ represents the location of the $p^{th}$ transmit channel in the antenna frame, q represents the receive channel indexing variable, and $v_q$ represents the location of the $q^{th}$ receive channel in the antenna frame.

In order to model a single scattering discrete in the far field, dynamical quantities may be expressed in the radar basis. Particularly, the radar basis may be centered at some point on the antenna face with the x-axis along antenna boresight and the y and z axes embedded in the plane of the antenna array in a right-handed fashion. The antenna boresight may represent the axis of maximum radiated power of a directional antenna.

As such, the coherent processing interval (CPI) begins at time (t=0) with $g_0$ representing the position of the scatter in the radar basis at t=0. The scatterer may be stationary in the local inertial frame (ENU), but may also have motion in the radar basis. Further, h represents the radar velocity (taken to be constant over the CPI) in the local inertial frame expressed in the radar basis with the assumption that its z-component is zero. In addition, w represents angular velocity in the local inertial frame expressed in the radar and may be made with the assumption that the x and y component of angular velocity are zero. Other assumptions may be made as well, such that the range is much longer than the antenna baseline and the dynamical quantities are constant during a pulse, but vary from pulse-to-pulse and channel-to-channel. Accordingly, the position of the scatterer at time t is then expressed in the following equations [2]-[5].

$$g(t)=[g_x(t), g_y(t), g_z(t)]^T \quad [2]$$

$$g_x(t)=[\cos(w_z t), -\sin(w_z t)]^T \cdot (g_0-ht) \quad [3]$$

$$g_y(t)=[\sin(w_z t), \cos(w_z t)]^T \cdot (g_0-ht) \quad [4]$$

$$g_z(t)=g_{0z} \quad [5]$$

At pulse n, the two way range from antenna p to the scatterer and back to antenna q is represented by equation [6].

$$r_{n,p,q}=|g(nI_p+pI_c)-v_p|+|g(nI_p+pI_c)-v_q| \quad [6]$$

To place range in the context of the measured phase history, a pulse-Doppler stretch LFM system may be used for modeling. Ignoring potential noise, reflection magnitude, and any unknown constant phase, then the signal phase after digitization can be represented by equation [7].

$$p_{k,n,p,q}=2\pi\gamma k r_{n,p,q}/(cf_s)+2\pi f\, r_{n,p,q}/c-\pi\gamma r_{n,p,q}^2/c^2 \quad [7]$$

In equation [7], c represents the propagation speed, $f_s$ represents the ADC sampling frequency, f represents the RF center frequency, and k represents the ADC indexing variable. As shown in equation [7], the usual factor of 4 changes to 2 since the range variable represents two-way range. Further, the third term in equation [7] corresponds to the residual video phase and is typically small. As a result, the third term can be ignored producing equation [8].

$$p_{k,n,p,q}=2\pi\gamma k r_{n,p,q}/(cf_s)+2\pi f\, r_{n,p,q}/c \quad [8]$$

Equation [8] represents the phase history. As such, in the basic single channel IFP, a single transmit and receive channel may be assumed as collocated at the origin of the radar (or another location of the radar). As a result, the two way range may be simplified to produce equation [9].

$$r_n=2|g_0-nI_p h| \quad [9]$$

The algorithm may further make a linear approximation of range through slow time, which results in equation [10]. In equation [10], $\hat{g}_0$ denotes a unit vector of the original quantity as shown in equation [11].

$$r_n \approx 2(|g_0|-nI_p h\cdot \hat{g}_0) \quad [10]$$

$$\hat{g}_0=g_0/|g_0| \quad [11]$$

As a result, the phase history for radar can be represented by equation [12].

$$p_{k,n} = \frac{4\pi\gamma k(|g_0|-nI_p h\cdot \hat{g}_0)}{cf_s} + \frac{4\pi f(|g_0|-nI_p h\cdot \hat{g}_0)}{c} \quad [12]$$

On the $n^{th}$ pulse, the matched filter for location $\tilde{g}_0$ (a stationary location in ENU expressed in the radar basis) performs an FFT along the fast time index. Accordingly, radar motion may be assumed and the filter may include an azimuth dependent range migration correction as shown in equation [13].

$$\Phi_n(\tilde{g}_0) = \sum_k \exp(jp_{k,n})\exp\left(-j\left[\frac{4\pi\gamma k(|\tilde{g}_0|-nI_p h\cdot \hat{\tilde{g}}_0)}{cf_s}\right]\right) \quad [13]$$

The output of the first stage of the matched filter simplifies to equation [14].

$$\Phi_n(\tilde{g}_0) = \frac{\sin(\pi N_k(f_x-\tilde{f}_x))}{\pi(f_x-\tilde{f}_x)} \exp(j4\pi f(|g_0|-nI_p h\cdot \hat{g}_0)/c) \quad [14]$$

The normalized fast frequency of the true scatterer (e.g., surface in the environment) and the matched filter can be represented by equation [15] and equation [16].

$$f_x = \frac{2\gamma|g_0|}{cf_s} \quad [15]$$

$$\tilde{f}_x = \frac{2\gamma|\tilde{g}_0|}{cf_s} \quad [16]$$

The second stage of the match filter is through slow time as represented by equation [17].

$$\Phi(\tilde{g}_0)=\Sigma_n \Phi_n(\tilde{g}_0)\exp(j[4\pi f\, nI_p h_0\cdot \hat{\tilde{g}}_0]/c) \quad [17]$$

Equation [17] can be further simplified to the following product of sin functions and a range-dependent phase as represented in equation [18].

$$\Phi(\tilde{g}_0) = \frac{\sin(\pi N_k(f_x-\tilde{f}_x))}{\pi(f_x-\tilde{f}_x)} \frac{\sin(\pi N_p(f_y-\tilde{f}_y))}{\pi(f_y-\tilde{f}_y)} \exp(j4\pi f|g_0|) \quad [18]$$

Where the normalized Doppler frequency of the true scatterer and the matched filter are represented in equation [19] and equation [20].

$$f_y = \frac{2fh\cdot \hat{g}_0}{cf_p} \quad [19]$$

$$\tilde{f}_y = \frac{2fh\cdot \hat{\tilde{g}}_0}{cf_p} \quad [20]$$

This is the 2D model developed to build the three dimensional IFP. It should be noted that this filter performs optimally in the SNR sense (assuming e.g., white noise) but in practice it can be very expensive to implement. We may take shortcuts in our implementation that will introduce error terms that aren't present in this derivation.

As shown above, the full expression of two way range was represented in equation [6]. A linear approximation of this function is shown in equation [21].

$$r_{n,p,q} \approx |g_0 - v_p| + |g_0 - v_q| + (nI_p + pI_c)(g\widehat{_0 - v_p} v_p + g\widehat{_0 - v_p} v_p) \cdot (g_0 \times w - h) \quad [21]$$

If $|v_p| \ll |g_0|$, then $|g_0 - v_p| \approx |g_0| - v_p \cdot \hat{g}_0$, then equation [22] is produced.

$$r_{n,p,q} \approx 2|g_0| - (v_p + v_q) \cdot \hat{g}_0 + (nI_p + pI_c)(g\widehat{_0 - v_p} v_p + g\widehat{_0 - v_p} v_p) \cdot (g_0 \times w - h) \quad [22]$$

Similarly, a small angle approximation further reduces range to equation [23].

$$r_{n,p,q} \approx 2|g_0| - (v_p + v_q) \cdot \hat{g}_0 + 2(nI_p + pI_c)\hat{g}_0 \cdot (g_0 \times w - h) \quad [23]$$

Since only the z-component of w is non-zero, this reduces to equation [24].

$$r_{n,p,q} \approx 2|g_0| - (v_p + v_q) \cdot \hat{g}_0 + 2(nI_p + pI_c)\hat{g}_0 \cdot h \quad [24]$$

For reference, the phase history is shown in equation [25].

$$p_{k,n,p,q} = \frac{2\pi\gamma k}{cf_s}(2|g_0| - (v_p + v_q) \cdot \hat{g}_0 - 2(nI_p + pI_c)\hat{g}_0 \cdot h) + \frac{2\pi f}{c}(2|g_0| + (v_p + v_q) \cdot \hat{g}_0 - 2(nI_p + pI_c)\hat{g}_0 \cdot h) \quad [25]$$

Application of the first stage of the 2D matched filter to the corresponding phase history is set forth in equation [26].

$$\Phi_{n,p,q}(\tilde{g}_0) = \Sigma_k \exp(j_{p_{k,n,p,q}})\exp(-j[4\pi\gamma k(|\tilde{g}_0| - nI_p h \cdot \hat{g}_0)/(cf_s)] \quad [26]$$

Applied to the TDMA MIMO phase history with the simplified expression of range above may yield equation [27]. In equation [27], $\varepsilon_x$ represents a deterministic frequency error as defined in equation [28].

$$\Phi_{n,p,q}(\tilde{g}_0) = \frac{\sin(\pi N_k(\varepsilon_x + f_x - \tilde{f}_x))}{\pi(\varepsilon_x + f_x - \tilde{f}_x)} \exp(j2\pi f r_{n,p,q}/C) \quad [27]$$

$$\varepsilon_x = \frac{4\pi\gamma[-(v_p + v_q) \cdot \hat{g}_0/2 - pI_c \hat{g}_0 \cdot h]}{cf_s} \quad [28]$$

In equation [28], the original TDMA mocomp analysis showed that $\varepsilon_x \ll 1$ and can be safely ignored. Next, a matched filter across slow time is applied as shown in equation [29].

$$\Phi_{p,q}(\tilde{g}_0) = \Sigma_k \Phi_{n,p,q}(\tilde{g}_0) \exp(j4\pi f\, nI_p \hat{h}_0 \cdot \hat{g}_0/c) \quad [29]$$

This reduces to equation [30].

$$\Phi_{p,q}(\tilde{g}_0) = \frac{\sin(\pi N_k(\varepsilon_k + f_x - \tilde{f}_x))}{\pi(\varepsilon_x + f_x - \tilde{f}_x)} \frac{\sin(\pi N_k(f_y - \tilde{f}_y))}{\pi(f_y - \tilde{f}_y)} \times \exp\left(j4\pi f\left(|g_0| - (v_p + v_q) \cdot \frac{\hat{g}_0}{2} - pI_c \hat{g}_0 \cdot h\right)\middle/c\right) \quad [30]$$

At this point, the uncompressed signal includes a DOA component and a nuisance component caused by platform motion. To develop some intuition about the former, define an elevation θ and azimuth Ø pointing vector as shown in equations [31] and [32].

$$\theta = \tan^{-1}\left(\frac{g_{0z}}{(g_{0z}^2 + g_{0y}^2)^{1/2}}\right) \quad [31]$$

$$\emptyset = \tan^{-1}\left(\frac{g_{0y}}{g_{0x}}\right) \quad [32]$$

Accordingly, equation [33] can be formed.

$$\hat{g}_0 = [\cos(\emptyset)\cos(\theta), \cos(\theta)\sin(\emptyset), \sin(\theta)]^T \quad [33]$$

Since $v_{px} = v_{qx} = 0$, then equation [34] can be formed.

$$(v_p + v_q) \cdot \hat{g}_0 = (v_{py} + v_{qy})\sin(\emptyset)\cos(\theta) + (v_{pz} + v_{qz})\sin(\theta) \quad [34]$$

Substituting this into the second stage output of the matched filter results in equation [35].

$$\Phi_{p,q}(\tilde{g}_0) = \frac{\sin(\pi N_k(\varepsilon_x + f_x - \tilde{f}_x))}{\pi(\varepsilon_x + f_x - \tilde{f}_x)} \frac{\sin(\pi N_k(f_y - \tilde{f}_y))}{\pi(f_y - \tilde{f}_y)} \times \exp(-j2\pi f((v_{py} + v_{qy})\sin(\emptyset)\cos(\theta) + (v_{pz} + v_{qz})\sin(\theta))/c) \times \exp(-j4\pi f p I_c \hat{g}_0 \cdot h/c) \times \exp(j4\pi f|g_0|/c) \quad [35]$$

The expression above can be manipulated to develop vertical resolution. The second exponential term is known and can be defined as equation [36].

$$\Delta_{p,q}(g_0) = \exp(-j4\pi f\, pI_c \hat{g}_0 \cdot h/c) \quad [36]$$

This term's conjugate is the motion compensation signal.

$$\Phi_{p,q}(\tilde{g}_0)\Delta_{p,q}(\tilde{g}_0) = \frac{\sin(\pi N_k(\varepsilon_x + f_x - \tilde{f}_x))}{\pi(\varepsilon_x + f_x - \tilde{f}_x)} \frac{\sin(\pi N_k(f_y - \tilde{f}_y))}{\pi(f_y - \tilde{f}_y)} \times \exp(-j2\pi f((v_{py} + v_{qy})\sin(\emptyset)\cos(\theta) + (v_{pz} + v_{qz})\sin(\theta))/c) \times \Delta_{p,q}(g_0)\Delta_{p,q}(\tilde{g}_0)^* \times \exp(j4\pi f|g_0|/c) \quad [37]$$

The first exponential term at this stage of processing represents the MIMO element of the filter. The following equation [38] provides vertical resolution.

$$\Psi(g_0) = \exp(-j2\pi f((v_{py} + v_{qy})\sin(\emptyset)\cos(\theta) + (v_{pz} + v_{qz})\sin(\theta))/c) \quad [38]$$

The final matched filter equation [39] is provided.

$$\Phi(\tilde{g}_0) = \Sigma_{p,q} \Phi_{p,q}(\tilde{g}_0) \Delta_{p,q}(\tilde{g}_0) \Psi_{p,q}(\tilde{g}_0)^* \quad [39]$$

Expanding terms produces equation [40].

$$\Phi(\tilde{g}_0) = \frac{\sin(\pi N_k(\varepsilon_x + f_x - \tilde{f}_x))}{\pi(\varepsilon_x + f_x - \tilde{f}_x)} \frac{\sin(\pi N_k(f_y - \tilde{f}_y))}{\pi(f_y - \tilde{f}_y)} \times \sum_{p,q} \Delta_{p,q}(g_0)\Delta_{p,q}(\tilde{g}_0)^* \Psi_{p,q}(g_0)\Psi_{p,q}(\tilde{g}_0)^* \quad [40]$$

As shown, equation [40] as well as other equations described above can be used to associate the z-position (height) of surfaces in the environment at the x-y pixel representing the same surface in a 2D image formed via processing measurements captured by the radar system configured with physically or virtually offset vertically aligned transmission antennas.

Figure 9:
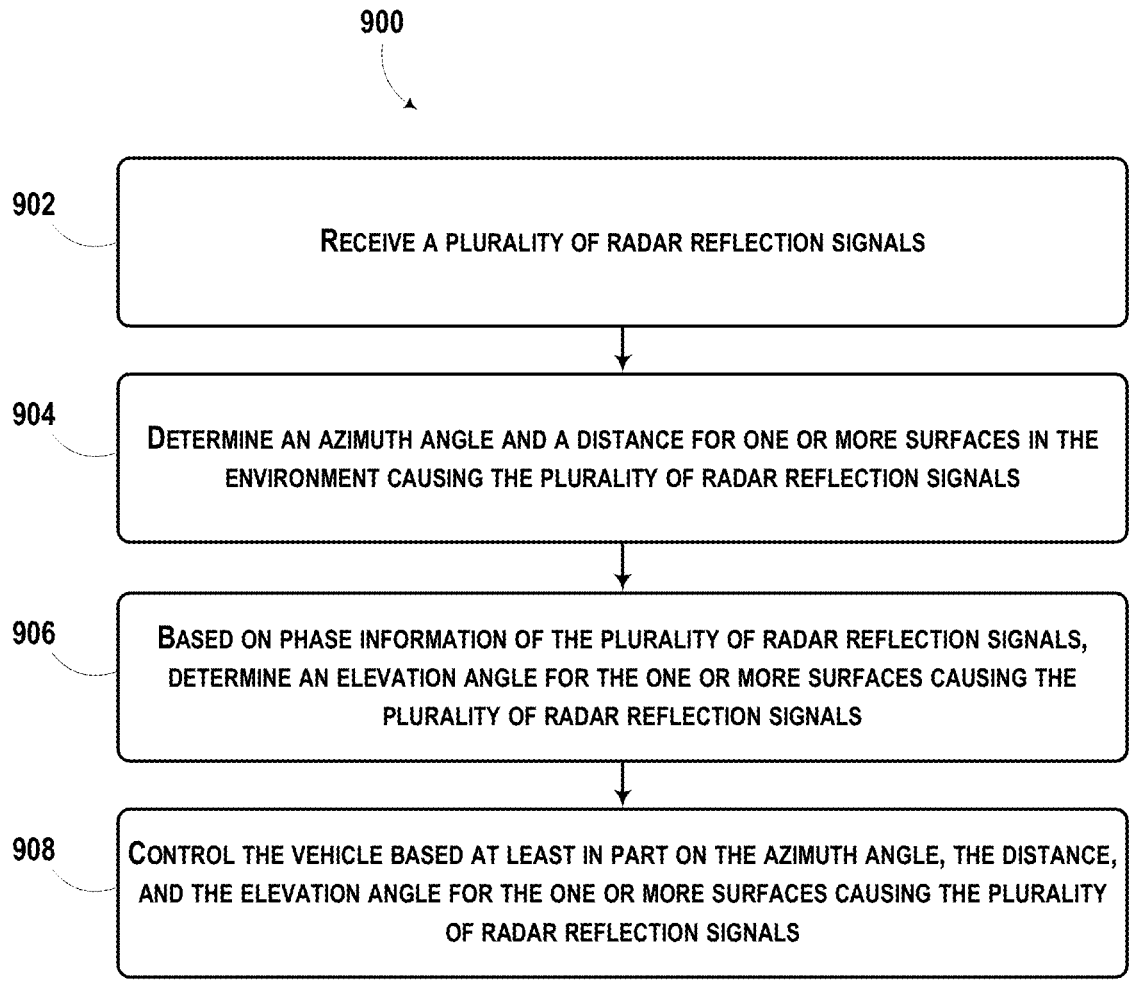
FIG. 9 is a flow chart of a method, according to example embodiments.

FIG. 9 is a flowchart of example method 900 for determining a 3D representation of an environment using radar. Method 900 represents an example method that may include one or more operations, functions, or actions, as depicted by one or more of blocks 902, 904, 906, and 908, each of which may be carried out by any of the systems shown in FIGS. 1-8 and FIG. 10, among other possible systems.

Those skilled in the art will understand that the flowchart described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. In examples, a computing system may cause a radar system to perform one or more blocks of method 900.

At block 902, method 900 includes receiving a plurality of radar reflection signals. For instance, the radar reflection signals may be received at a radar unit that is part of a vehicle radar system. In particular, the receiving radar unit may include one or more staggered linear arrays. As a result, reception antennas of the staggered linear array may receive the radar reflection signals. In some examples, a radar unit (or radar units) may transmit radar signals using a staggered linear antenna array and responsively receive reflections of the radar signals.

At block 904, method 900 includes determining an azimuth angle and a distance for one or more surfaces in the environment causing the plurality of radar reflection signals. In some examples, the azimuth angle may represent the angle of the radar beam with respect to north. Further, the distance for one or more surfaces in the environment may represent a distance between the radar unit and the surface that reflected a radar signal back towards the radar unit. As discussed above, distance may be determined by measuring the time required for a pulse of radar signal to make a round trip from the radar unit to a surface in the environment and back using the relation distance equals time multiplied by velocity (i.e., the speed of light).

At block 906, method 900 includes determining an elevation angle for one or more surfaces causing the plurality of radar reflection signals based on phase information of the plurality of radar reflection signals. The elevation angle may represent the angle of the beam with respect to the ground (i.e., the height of the surface reflecting radar signals back to the radar unit). As such, using the calculated distance, azimuth angle, and elevation angle, the exact location of a reflecting surface can be determined.

In some examples, elevation angle may represent the height of a reflecting surface relative to the height of the radar unit. As such, processing radar reflection signals may factor whether elevation angles represent the height of the reflecting surfaces with respect to the ground or the height of the radar unit.

In additional examples, the phase information for radar reflection signals may depend on the elevation angles of surfaces in the environment causing the radar reflection signals. For example, objects having different heights may cause the radar reflection signals received at the radar unit to have different phase information. Particularly, the different phase information may vary based on the difference in the heights of the objects. As an example illustration, radar reflections reflecting off portions of a vehicle in the environment may have different phase information compared to the phase information of radar reflection signals reflecting off portions of the road and road boundaries (e.g., curbs, fences) positioned close to the ground.

In further examples, the phase information of the radar reflection signals depends on respective offsets of one or multiple radiating elements of the staggered linear array of the radar unit. For instance, the phase information can depend on the extent of the offset from the centerline of the radar unit for each radiating element. Particularly, in some examples, some radiating elements (e.g., transmission and/or reception antennas) may differ in the amount that each radiating element is offset from a centerline of the linear array.

In addition, in some instances, the phase information can depend on the quantity of radiating elements offset in the staggered linear array of the radar unit. For instance, some radar units may include more or fewer radiating elements offset in the staggered linear array. In turn, the phase information received can vary depending on the configuration of the staggered linear array of the radar unit.

At block 908, method 900 includes controlling the vehicle based at least in part on the azimuth angle, the distance, and the elevation angle for the one or more surfaces causing the plurality of radar reflection signals. For instance, a vehicle control system may use the information (e.g., azimuth angle, distance, elevation angle) to determine positions and orientations of objects in the environment relative to the vehicle when formulating control strategy in the area. In addition, the vehicle control system may also use the information to determine if objects are moving towards or away from the vehicle as well as the rate of change in positions of one or more objects. For instance, the vehicle control system may monitor and adjust operation based on the movement of nearby vehicles and pedestrians detected using radar.

In some examples, method 900 may further involve determining a 3D map of the environment surrounding the vehicle based on the azimuth angle, the distance, and the elevation angle for one or multiple surfaces causing the radar reflection signals. For instance, the 3D map may include data points arranged in point clouds that depict the distance, elevation, and position of surfaces reflecting radar signals from the radar unit relative to the vehicle using the radar unit. As such, the 3D map may be used to formulate navigation strategy, detect potential objects that can interfere with navigation, and monitor the surroundings of the vehicle, among other possible uses. For instance, a system may further use the 3D map to supplement other sensor measurements to autonomously navigate the vehicle.

In some embodiments, determining a 3D map based on received radar reflections may involve generating a 3D map based on the azimuth angle, the distance, and elevation angle for surfaces that reflected the radar reflections. The 3D map may include pixels that represent the positions and height of surfaces in the environment relative to the vehicle. For example, the 3D map may represent the height, position, and configuration (e.g., shape, dimensions) of objects and other surfaces in the environment from the perspective of the radar unit as radar reflections are obtained and used to develop the 3D map as the vehicle navigates the environment. As such, the 3D map may represent spatial information regarding traffic signals, traffic signs, positions and movements of pedestrians, vehicles, and other objects moving relative to the vehicle, among other aspects of the environment.

In some instances, the 3D map may further assist with determining weather conditions (e.g., snowy or wet conditions) while also providing information for determining navigation strategy. In further examples, a system may compile the 3D map generated using radar measurements to form a map depicting an expanded area of the environment. The vehicle control system may access the compiled map when navigating in the area. In some instances, a system may also share generated 3D maps with other vehicles, such as vehicles traveling in the area.

In further examples, method 900 may involve transmitting radar signals at the radar unit coupled to the vehicle operating in the environment. For instance, the radar unit may transmit linear frequency modulated radar signals using a staggered linear array of transmission antennas. As such, the radar unit may receive reflections of the linear frequency modulated radar signals to perform method 900. As a further example, a radar unit used to perform method 900 may include a staggered linear array of transmission antennas and a staggered linear array of reception antennas. In other examples, the radar unit may include a linear array of transmission antennas and a staggered linear array of reception antennas. In yet another example, a radar unit may include a staggered linear array of transmission antennas and a linear array of reception antennas.

Figure 10:
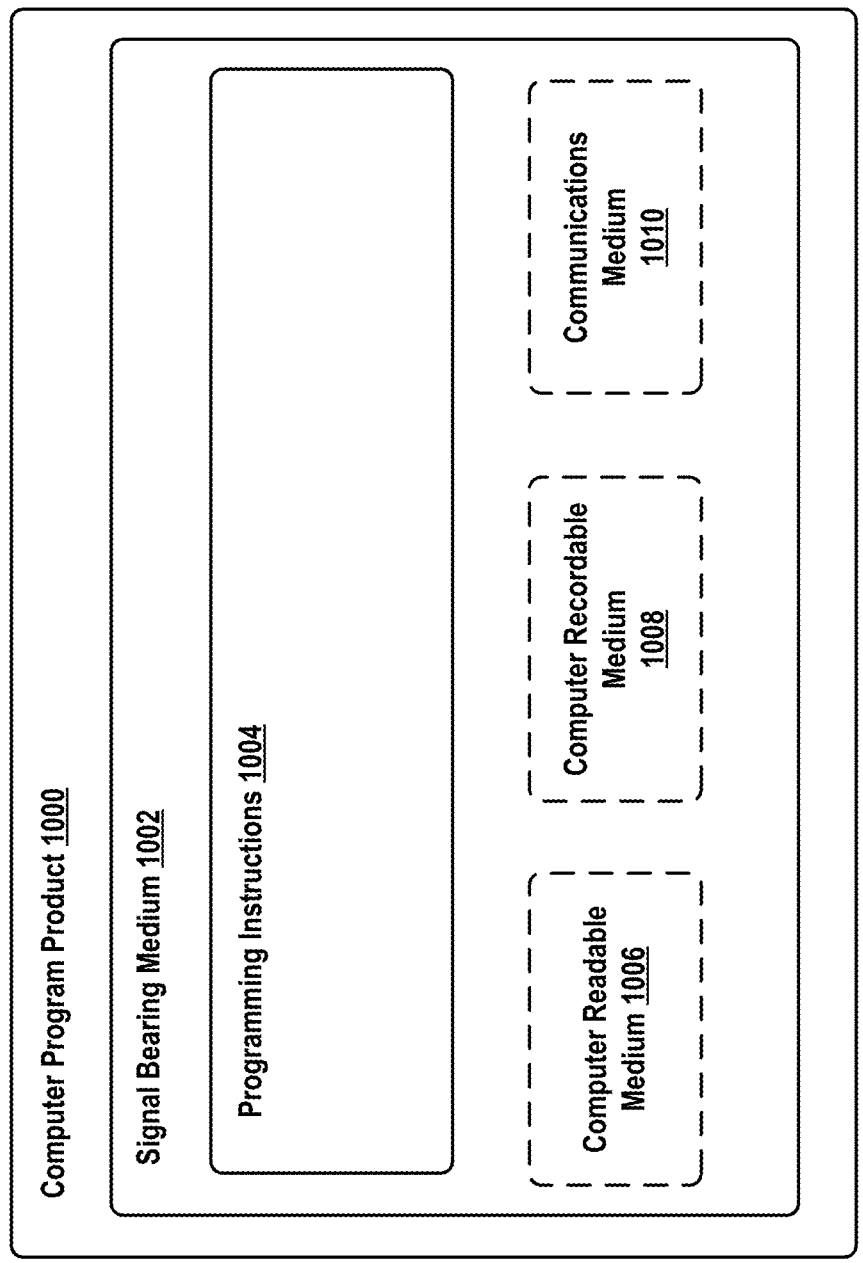
FIG. 10 illustrates a schematic diagram of a computer program, according to example embodiments.

FIG. 10 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 1000 is provided using signal bearing medium 1002, which may include one or more programming instructions 1004 that, when executed by one or more processors may provide functionality or portions of the functionality described above with respect to FIGS. 1-6. In some examples, the signal bearing medium 1002 may encompass a non-transitory computer-readable medium 1006, such as, but not limited to, a hard disk drive, a Compact Disc (CD), a Digital Video Disk (DVD), a digital tape, memory, etc. In some implementations, the signal bearing medium 1002 may encompass a computer recordable medium 1008, such as, but not limited to, memory, read/write (R/W) CDs, R/W DVDs, etc. In some implementations, the signal bearing medium 1002 may encompass a communications medium 1010, such as, but not limited to, a digital and/or an analog communication medium (e.g., a fiber optic cable, a waveguide, a wired communications link, a wireless communication link, etc.). Thus, for example, the signal bearing medium 1002 may be conveyed by a wireless form of the communications medium 1010.

The one or more programming instructions 1004 may be, for example, computer executable and/or logic implemented instructions. In some examples, a computing device such as the computer system 112 of FIG. 1 may be configured to provide various operations, functions, or actions in response to the programming instructions 1004 conveyed to the computer system 112 by one or more of the computer readable medium 1006, the computer recordable medium 1008, and/or the communications medium 1010.

The non-transitory computer readable medium could also be distributed among multiple data storage elements, which could be remotely located from each other. The computing device that executes some or all of the stored instructions could be a vehicle, such as vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
transmitting, by a radar unit coupled to a vehicle in an environment, a plurality of radar signals using a staggered linear array arranged in multiple-input multiple-output (MIMO) architecture, wherein the staggered linear array includes a vertical centerline extending a length of the staggered linear array and one or more radiating elements offset from the vertical centerline;
receiving, at the radar unit, a plurality of radar reflection signals corresponding to the plurality of radar signals;
determining an azimuth angle and a distance for one or more surfaces in the environment causing the plurality of radar reflection signals;
performing two-dimensional (2D) SAR image formation to generate a 2D SAR map based on the azimuth angle and the distance for the one or more surfaces;
based on phase information of the plurality of radar reflection signals, determining an elevation angle for the one or more surfaces using a three dimensional (3D) matched filter;
based on the azimuth angle, the distance, and the elevation angle for the one or more surfaces causing the plurality of radar reflection signals, determining a 3D map representing the environment surrounding the vehicle, wherein the 3D map includes pixels that represent positions and heights of the one or more surfaces relative to the vehicle; and
controlling the vehicle based at least in part on the 3D map representing the environment surrounding the vehicle.

2. The method of claim 1, wherein receiving the plurality of radar reflection signals comprises:

receiving the plurality of radar reflection signals using the staggered linear array of the radar unit.

3. The method of claim 2, wherein the phase information of the plurality of radar reflection signals depends on respective elevations of the one or more surfaces in the environment causing the plurality of radar reflection signals.

4. The method of claim 3, wherein the phase information of the plurality of radar reflection signals further depends on respective offsets of one or more radiating elements of the staggered linear array of the radar unit.

5. The method of claim 1, wherein transmitting the plurality of radar signals comprises:
transmitting linear frequency modulated radar signals.

6. A system comprising:
a radar unit configured to:
transmit a plurality of radar signals using a staggered linear array arranged in multiple-input multiple-output (MIMO) architecture, wherein the staggered linear array includes a vertical centerline extending a length of the staggered linear array and one or more radiating elements offset from the vertical centerline; and
receive a plurality of radar reflection signals corresponding to the plurality of radar signals;
a processor configured to:
determine an azimuth angle and a distance for one or more surfaces in an environment causing the plurality of radar reflection signals;
perform two-dimensional (2D) SAR image formation to generate a 2D SAR map based on the azimuth angle and the distance for the one or more surfaces;
based on phase information of the plurality of radar reflection signals, determine an elevation angle for the one or more surfaces using a three dimensional (3D) matched filter;
based on the azimuth angle, the distance, and the elevation angle for the one or more surfaces causing the plurality of radar reflection signals, determine a 3D map representing the environment surrounding the vehicle, wherein the 3D map includes pixels that represent positions and heights of the one or more surfaces relative to the vehicle; and
control a vehicle based at least in part on the 3D map representing the environment surrounding the vehicle.

7. The system of claim 6, wherein the phase information of the plurality of radar reflection signals depends on respective elevations of the one or more surfaces in the environment causing the plurality of radar reflection signals.

8. The system of claim 7, wherein the phase information of the plurality of radar reflection signals further depends on respective offsets of one or more radiating elements of the staggered linear array of the radar unit.

9. The system of claim 7, wherein the phase information of the plurality of radar reflection signals further depends on respective virtual offsets determined for one or more radiating elements of the staggered linear array of the radar unit.

10. The system of claim 7, wherein the radar unit is further configured to transmit linear frequency modulated radar signals.

11. The system of claim 6, wherein the radar unit configured to receive the plurality of radar reflection signals is part of a set of radar units coupled to the vehicle, wherein each radar unit of the set of radar units is configured to operate approximately over a 90-degree region.

12. The system of claim 11, wherein the set of radar units coupled to the vehicle is configured to operate over a 360-degree azimuth plane around the vehicle.

13. The system of claim 12, wherein the processor is further configured to:
generate the 3D map representing the environment surrounding the vehicle such that the 3D map represents the 360-degree azimuth plane around the vehicle using the set of radar units, wherein each radar unit of the set of radar units comprises a staggered linear array of radiating elements.

14. A non-transitory computer-readable medium configured to store instructions, that when executed by a computing system comprising one or more processors, causes the computing system to perform operations comprising:
transmitting, by a radar unit coupled to a vehicle in an environment, a plurality of radar signals using a staggered linear array arranged in multiple-input multiple-output (MIMO) architecture, wherein the staggered linear array includes a vertical centerline extending a length of the staggered linear array and one or more radiating elements offset from the vertical centerline;
receiving, at the radar unit, a plurality of radar reflection signals corresponding to the plurality of radar signals;
determining an azimuth angle and a distance for one or more surfaces in the environment causing the plurality of radar reflection signals;
performing two-dimensional (2D) SAR image formation to generate a 2D SAR map based on the azimuth angle and the distance for the one or more surfaces;
based on phase information of the plurality of radar reflection signals, determining an elevation angle for the one or more surfaces using a three dimensional (3D) matched filter;
based on the azimuth angle, the distance, and the elevation angle for the one or more surfaces causing the plurality of radar reflection signals, determining a 3D map of the environment surrounding the vehicle, wherein the 3D map includes pixels that represent positions and heights of the one or more surfaces relative to the vehicle; and
controlling the vehicle based at least in part on the 3D map representing the environment surrounding the vehicle.

* * * * *